United States Patent
Sato

(10) Patent No.: US 8,503,094 B2
(45) Date of Patent: Aug. 6, 2013

(54) ZOOM LENS, OPTICAL APPARATUS WITH THE ZOOM LENS, AND METHOD OF MANUFACTURING ZOOM LENS

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/058,582

(22) PCT Filed: Jul. 13, 2009

(86) PCT No.: PCT/JP2009/062679
§ 371 (c)(1),
(2), (4) Date: Feb. 11, 2011

(87) PCT Pub. No.: WO2010/018727
PCT Pub. Date: Feb. 18, 2010

(65) Prior Publication Data
US 2011/0149412 A1   Jun. 23, 2011

(30) Foreign Application Priority Data

Aug. 12, 2008  (JP) ................................. 2008-207755
Aug. 12, 2008  (JP) ................................. 2008-207756

(51) Int. Cl.
*G02B 15/14*   (2006.01)
*G02B 27/64*   (2006.01)

(52) U.S. Cl.
USPC .......................................... 359/683; 359/557

(58) Field of Classification Search
USPC .................. 359/676, 683, 554, 557
See application file for complete search history.

(56) References Cited

U.S. PATENT DOCUMENTS

| | | |
|---|---|---|
| 2003/0165020 A1 | 9/2003 | Satori et al. |
| 2006/0056055 A1 | 3/2006 | Obama et al. |
| 2007/0229966 A1 | 10/2007 | Nakatani et al. |
| 2008/0106790 A1 | 5/2008 | Yamada et al. |

FOREIGN PATENT DOCUMENTS

| | | |
|---|---|---|
| JP | 8-5913 A | 1/1996 |
| JP | 2001-033703 A | 2/2001 |
| JP | 2001-194590 A | 7/2001 |
| JP | 2001-350093 A | 12/2001 |
| JP | 2004-117826 A | 4/2004 |

(Continued)

OTHER PUBLICATIONS

Extended European search report issued Mar. 5, 2012, in European Patent Application No. 09806623.6.

(Continued)

*Primary Examiner* — Scott J Sugarman
(74) *Attorney, Agent, or Firm* — Miles & Stockbridge P.C.

(57) ABSTRACT

A zoom lens ZL, which is mounted on an electronic still camera 1 or the like, is composed of, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The first lens unit G1 has, in order from the object side, a negative meniscus lens with a convex surface on the object side, and a positive lens, and the second lens unit G2 has, in order from the object side, a negative meniscus lens with a convex surface on the object side, a biconcave lens, and a positive lens. The zoom lens satisfies a condition of the following expression:

$$0.005 < (-f2) \times f3/(f1^2) < 0.023,$$

where f1, f2, and f3 are the respective focal lengths of the first, second, and third lens units G1, G2, and G3.

28 Claims, 14 Drawing Sheets

FOREIGN PATENT DOCUMENTS

| | | |
|---|---|---|
| JP | 2006-113453 A | 4/2006 |
| JP | 2007-047538 A | 2/2007 |
| JP | 2007-264174 A | 10/2007 |
| JP | 2007-264395 A | 10/2007 |

OTHER PUBLICATIONS

English Translation of International Preliminary Report on Patentability from International Patent Application No. PCT/JP2009/062679.

(a)

(b)

(c)

(a)

(b)

(c)

ZOOM LENS, OPTICAL APPARATUS WITH THE ZOOM LENS, AND METHOD OF MANUFACTURING ZOOM LENS

TECHNICAL FIELD

The present invention relates to a zoom lens, an optical apparatus with the zoom lens, and a method of manufacturing the zoom lens.

BACKGROUND ART

There are hitherto-proposed zoom lenses suitable for electronic still cameras and others (e.g., cf. Patent Documents 1 and 2).
Citation List
Patent Literature
Patent Document 1: Japanese Patent Application Laid-open No. 2007-47538
Patent Document 2: Japanese Patent Application Laid-open No. 2007-264174

SUMMARY OF INVENTION

Technical Problem

However, the conventional zoom lenses had the problem that the angle of view at the wide-angle end and the zoom ratio could not be increased while maintaining excellent optical performance.

The present invention has been accomplished in view of this problem and it is an object of the present invention to provide a zoom lens with a large angle of view at the wide-angle end and a large zoom ratio and with a small overall length at the wide-angle end, while maintaining excellent optical performance.

Solution to Problem

In order to solve the above problem, a zoom lens according to the present invention comprises: in order from the object side, a first lens unit having a positive refractive power, a second lens unit having a negative refractive power, a third lens unit having a positive refractive power, a fourth lens unit having a negative refractive power, and a fifth lens unit having a positive refractive power; the first lens unit has a negative lens and a positive lens in order from the object side; the second lens unit has an object-side negative lens, an image-side negative lens, and a positive lens in order from the object side; the zoom lens satisfies a condition of the following expression: $0.005 < (-f2) \times f3/(f1^2) < 0.023$, where f1 is the focal length of the first lens unit, f2 the focal length of the second lens unit, and f3 the focal length of the third lens unit.

The zoom lens is preferably configured as follows: at least one of the negative lens and the object-side negative lens is a negative meniscus lens with a convex surface on the object side.

The zoom lens is preferably configured as follows: the image-side negative lens is of a biconcave shape.

The zoom lens is preferably configured to satisfy a condition of the following expression: $0.050 < (-f2)/f1 < 0.140$.

The zoom lens is preferably configured to satisfy a condition of the following expression: $0.57 < f5/f1 < 1.30$, where f5 is the focal length of the fifth lens unit.

The zoom lens is preferably configured to satisfy a condition of the following expression: $1.85 < n11 < 2.30$, where n11 is a refractive index of a medium of the negative lens at the d-line.

The zoom lens is preferably configured as follows: the first lens unit is composed of a cemented lens of the negative lens and the positive lens; the second lens unit is configured so that all the lenses are arranged with an air space in between.

The zoom lens is preferably configured to satisfy a condition of the following expression: $0.10 < f3/(-f4) < 0.45$, where f3 is the focal length of the third lens unit and f4 the focal length of the fourth lens unit.

The zoom lens is preferably configured as follows: an object-side lens surface of the object-side negative lens consists of an aspherical surface; at least one of lens surfaces of the positive lens in the second lens unit consists of an aspherical surface.

The zoom lens is preferably configured as follows: at least one of the second lens unit and the third lens unit is configured so that at least a part thereof moves so as to have a component in a substantially perpendicular direction to the optical axis.

The zoom lens is preferably configured as follows: the fifth lens unit is configured as a positive lens in which an object-side lens surface has a convex shape on the object side and has a smaller radius of curvature than an image-side lens surface; during focusing with a photographing object at a finite distance, the fifth lens unit moves along the optical axis toward the object.

The zoom lens is preferably configured as follows: with a photographing object at infinity and during change of a lens position state from a wide-angle end state to a telephoto end state, the first lens unit and the third lens unit move toward the object, and the second lens unit moves along the optical axis toward an image from the wide-angle end state to a predetermined intermediate focal length state and moves along the optical axis toward the object from the predetermined intermediate focal length state to the telephoto end state.

The zoom lens is preferably configured as follows: the third lens unit has, in order from the object side, a negative meniscus lens with a convex surface on the object side, and a biconvex lens with an image-side lens surface of an aspherical surface; the fourth lens unit has a negative meniscus lens with a convex surface on the object side.

The zoom lens is preferably configured as follows: the third lens unit has, in order from the object side, a positive lens with an object-side lens surface of an aspherical surface of a convex shape on the object side, a negative meniscus lens with a convex surface on the object side, and a biconvex lens with an image-side lens surface of an aspherical surface; the fourth lens unit has a negative meniscus lens with a convex surface on the object side.

An optical apparatus according to the present invention comprises any one of the above-described zoom lenses.

A zoom lens manufacturing method according to the present invention is a method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power, the method comprising: arranging a negative lens and a positive lens in order from the object side, in the first lens unit; and arranging an object-side negative lens with an object-side lens surface of an aspherical surface, an image-side negative lens, and a positive lens with at least one aspherical surface, in order from the object side, in the second lens unit.

The zoom lens manufacturing method is preferably configured as follows: the zoom lens satisfies a condition of the following expression: $0.005 < (-f2) \times f3/(f1^2) < 0.023$, where f1 is the focal length of the first lens unit, f2 the focal length of the second lens unit, and f3 the focal length of the third lens unit.

The zoom lens manufacturing method is preferably configured as follows: at least one of the negative lens and the object-side negative lens is a negative meniscus lens with a convex surface on the object side.

The zoom lens manufacturing method is preferably configured as follows: the image-side negative lens is of a biconcave shape.

The zoom lens manufacturing method is preferably configured as follows: the zoom lens satisfies a condition of the following expression: $0.050 < (-f2)/f1 < 0.140$.

The zoom lens manufacturing method is preferably configured as follows: the zoom lens satisfies a condition of the following expression: $0.57 < f5/f1 < 1.30$, where f5 is the focal length of the fifth lens unit.

The zoom lens manufacturing method is preferably configured as follows: the zoom lens satisfies a condition of the following expression: $1.85 < n11 < 2.30$, where n11 is a refractive index of a medium of the negative lens at the d-line.

The zoom lens manufacturing method is preferably configured as follows: the first lens unit is composed of a cemented lens of the negative lens and the positive lens; the second lens unit is configured so that all the lenses are arranged with an air space in between.

The zoom lens manufacturing method is preferably configured as follows: the zoom lens satisfies a condition of the following expression: $0.10 < f3/(-f4) < 0.45$, where f3 is the focal length of the third lens unit and f4 the focal length of the fourth lens unit.

The zoom lens manufacturing method is preferably configured as follows: at least one of the second lens unit and the third lens unit is configured so that at least a part thereof moves so as to have a component in a substantially perpendicular direction to the optical axis.

The zoom lens manufacturing method is preferably configured as follows: the fifth lens unit is configured as a positive lens in which an object-side lens surface has a convex shape on the object side and has a smaller radius of curvature than an image-side lens surface; during focusing with a photographing object at a finite distance, the fifth lens unit moves along the optical axis toward the object.

The zoom lens manufacturing method is preferably configured as follows: with a photographing object at infinity and during magnification variation from a wide-angle end state to a telephoto end state, the first lens unit and the third lens unit move toward the object, and the second lens unit moves along the optical axis toward an image from the wide-angle end state to a predetermined intermediate focal length state and moves along the optical axis toward the object from the predetermined intermediate focal length state to the telephoto end state.

The zoom lens manufacturing method is preferably configured as follows: the third lens unit has, in order from the object side, a negative meniscus lens with a convex surface on the object side, and a biconvex lens with an image-side lens surface of an aspherical surface; the fourth lens unit has a negative meniscus lens with a convex surface on the object side.

The zoom lens manufacturing method is preferably configured as follows: the third lens unit has, in order from the object side, a positive lens with an object-side lens surface of an aspherical surface of a convex shape on the object side, a negative meniscus lens with a convex surface on the object side, and a biconvex lens with an image-side lens surface of an aspherical surface; the fourth lens unit has a negative meniscus lens with a convex surface on the object side.

Advantageous Effects of Invention

When the zoom lens, the optical apparatus with the zoom lens, and the zoom lens manufacturing method according to the present invention are configured as described above, the zoom lens is provided as one with a large angle of view at the wide-angle end and a large zoom ratio and with a small overall length at the wide-angle end while maintaining excellent optical performance.

DESCRIPTION OF EMBODIMENTS

Figure 1:
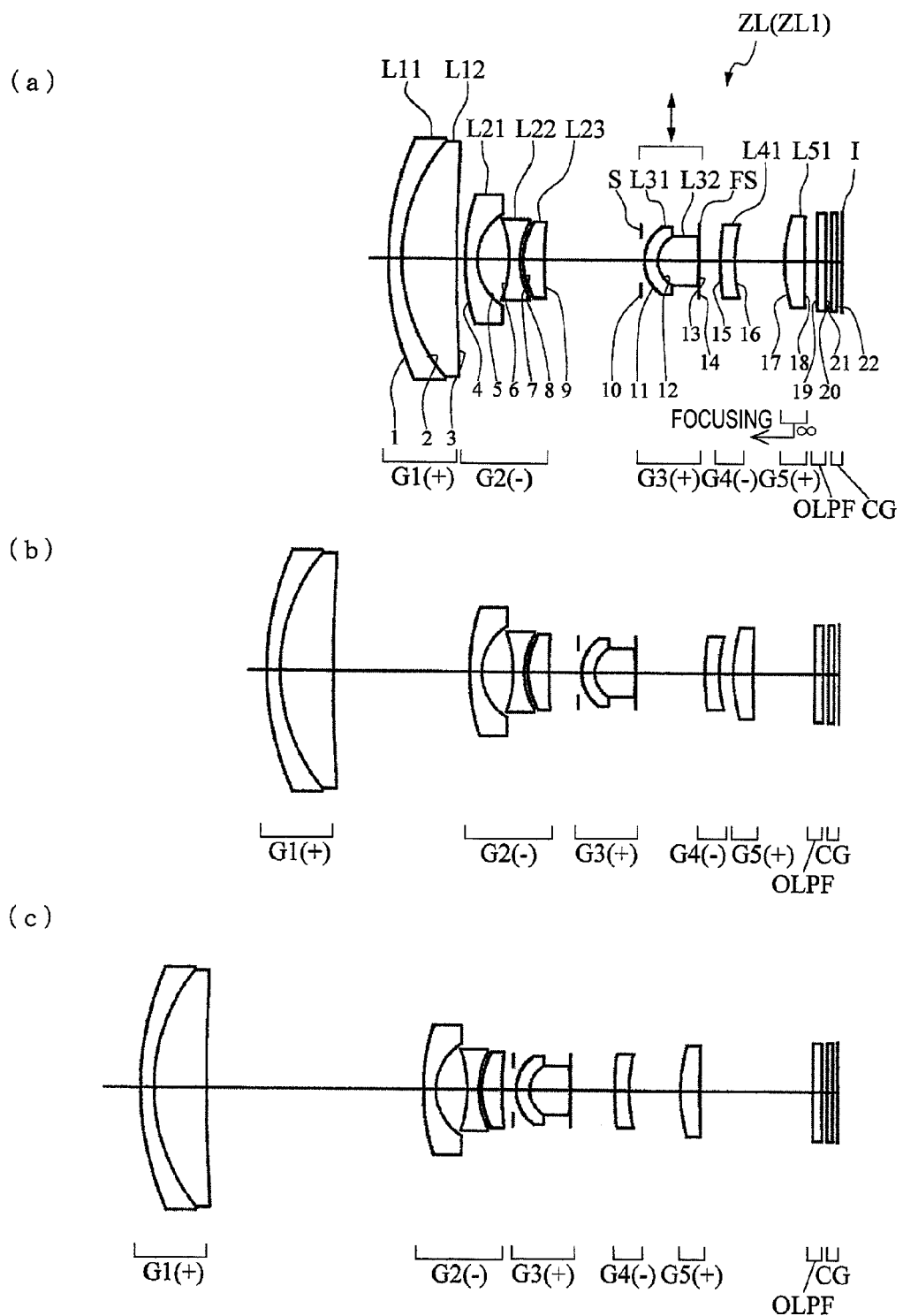
FIG. 1 is cross-sectional views showing a configuration of a zoom lens according to the first example and showing positions of respective lens units in an infinity in-focus state (a) at a wide-angle focal length, (b) at an intermediate focal length, and (c) at a telephoto focal length.

A preferred embodiment of the present invention will be described below with reference to the drawings. In the present specification, the wide-angle end state and the telephoto end state will refer to those in an infinity in-focus state unless otherwise stated in particular. As shown in FIG. 1, a zoom lens ZL of the present embodiment is composed of, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

When the lens configuration of the present zoom lens ZL is described from an optical viewpoint, the first lens unit G1 is a first condensing lens unit, the second lens unit G2 is a magnification-varying lens unit, a combination of the third lens unit G3 and the fourth lens unit G4 is an imaging lens unit, and the fifth lens unit G5 is a field lens unit.

Furthermore, features in aberration correction will be described. The first lens unit G1 and the second lens unit G2 significantly contribute to variation in spherical aberration and curvature of field with zooming because the ray incidence height and ray incidence angle thereto significantly vary during variation in magnification. The third lens unit G3 is preferably configured to have an aperture stop and has little contribution to variation in various aberrations with zooming because the ray incidence height and ray incidence angle thereto vary little during variation in magnification. However, since it further condenses the beam condensed by the first lens unit G1, to form an image, the third lens unit G3 needs to have a strong refractive power and tends to be composed of lenses with a small radius of curvature. When the third lens unit G3 is composed of the lenses with a small radius of curvature, significant higher-order spherical aberration tends to occur. The fourth lens unit G4 and the fifth lens unit G5 have significant contribution to variation in curvature of field rather than spherical aberration because the diameter of the incident beam is small for each image height. Furthermore, the fifth lens unit G5 also has a function to keep the exit pupil farther away on the object side from the image plane, in order to achieve matching between a solid-state imaging device and the photographing optical system typified by shading.

In order to keep the overall length of the optical system short in the wide-angle end state, the zoom lens ZL of the present embodiment is preferably configured so that the total number of lenses constituting the first lens unit G1 and the second lens unit G2 is not more than 5 (specifically, so that the first lens unit G1 is composed of two concave and convex lenses and the second lens unit G2 is composed of three concave, concave, and convex lenses) and so that the total glass thickness (including air spaces) of the first lens unit G1 and the second lens unit G2 is smaller than that of the conventional products.

However, in order to prevent variation in curvature of field with zooming from becoming significant, the first lens unit G1 is preferably configured to have a negative meniscus lens L11 with a convex surface on the object side, and a positive lens L12 and to be concentric with an aperture stop S. Furthermore, in order to prevent variation in spherical aberration with zooming from becoming significant, the second lens unit G2 is preferably configured to have, in order from the object side, a negative meniscus lens L21 with a convex surface on the object side, a biconcave lens L22, and a positive lens L23.

The below will describe conditions for maintaining good imaging performance when the zoom ratio is increased with the overall length being kept small. The zoom lens ZL of the present embodiment preferably satisfies Condition (1) below where f1 is the focal length of the first lens unit G1, f2 the focal length of the second lens unit G2, and f3 the focal length of the third lens unit G3.

$$0.005 < (-f2) \times f3 / (f1^2) < 0.023 \tag{1}$$

Condition (1) defines a ratio of the focal lengths of the second lens unit G2 and the third lens unit G3 to the focal length of the first lens unit G1. The ratio over the upper limit of Condition (1) is undesirable because the curvature of field at the wide-angle end becomes negatively large. The upper limit of Condition (1) is preferably set to 0.021. On the other hand, the ratio below the lower limit of Condition (1) is undesirable because the variation in spherical aberration with magnification variation becomes large. The lower limit of Condition (1) is preferably set to 0.010.

The zoom lens ZL of this configuration preferably satisfies Condition (2) below where f1 is the focal length of the first lens unit G1 and f2 the focal length of the second lens unit G2. When the zoom lens satisfies this Condition (2), it becomes feasible to achieve a large zoom ratio while keeping the overall length small, and to maintain good imaging performance.

$$0.050 < (-f2)/f1 < 0.140 \tag{2}$$

Condition (2) defines a ratio of the focal length of the second lens unit G2 to the focal length of the first lens unit G1. The ratio over the upper limit of Condition (2) is undesirable because the curvature of field in the telephoto end state becomes positively large. The upper limit of Condition (2) is preferably set to 0.135 or 0.130. On the other hand, the ratio below the lower limit of Condition (2) is undesirable because the variation in spherical aberration with magnification variation becomes large. The lower limit of Condition (2) is preferably set to 0.070.

This zoom lens ZL preferably satisfies Condition (3) below where f1 is the focal length of the first lens unit G1 and f5 the focal length of the fifth lens unit G5. When this Condition (3) is satisfied, it becomes feasible to achieve a large zoom ratio with the overall length being kept small, while maintaining good imaging performance.

$$0.57 < f5/f1 < 1.30 \tag{3}$$

Condition (3) defines a ratio of the focal length of the fifth lens unit G5 to the focal length of the first lens unit G1. The ratio over the upper limit of Condition (3) is undesirable because the curvature of field in the telephoto end state becomes positively large. The upper limit of Condition (3) is preferably set to 1.10. On the other hand, the ratio below the lower limit of Condition (3) is undesirable because the variation in spherical aberration with magnification variation becomes large. The lower limit of Condition (3) is preferably set to 0.60.

In this zoom lens ZL, in order to decrease the overall length, the total thickness of the first lens unit G1 can be decreased by increasing the refractive index of glass adopted for the first lens unit G1 and increasing the radius of curvature of lens surfaces. When a medium of the negative meniscus lens in the first lens unit G1 has the refractive index n11 at the d-line, it preferably satisfies Condition (4) below, which enables good aberration compensation.

$$1.85 < n11 < 2.30 \tag{4}$$

Condition (4) defines the refractive index at the d-line of the medium of the negative meniscus lens in the first lens unit G1. The refractive index over the upper limit of Condition (4) is undesirable because chromatic aberration at the telephoto end becomes large. The upper limit of Condition (4) is preferably set to 2.15. On the other hand, the refractive index below the lower limit of Condition (4) is undesirable because it is difficult to correct spherical aberration with the total thickness of the first lens unit G1 being kept small. The lower limit of Condition (4) is preferably set to 1.88.

In the zoom lens ZL of the present embodiment, the first lens unit G1 is preferably configured as a cemented lens of the negative meniscus lens L11 and the positive lens L12, whereby they are prevented from decentering relative to each other during assembly into a lens barrel, which prevents occurrence of image field inclination (tilting phenomenon of the image plane) due to decentering.

The second lens unit G2 (the negative meniscus lens L21, biconcave lens L22, and positive lens L23 in FIG. 1) is preferably configured so that all the lenses are arranged with an air space in between, which can ensure freedom for aberration correction.

This zoom lens ZL preferably satisfies Condition (5) below where f3 is the focal length of the third lens unit G3 and f4 the focal length of the fourth lens unit G4. When the zoom lens satisfies this Condition (5), it becomes feasible to achieve good aberration correction while keeping the effective diameter of the first lens unit G1 small. Specifically, high magnification variation can be achieved, for example, even if the effective diameter is as small as 18 to 22 mm.

$$0.10 < f3/(-f4) < 0.45 \tag{5}$$

Condition (5) defines a ratio of the focal length of the third lens unit G3 to the focal length of the fourth lens unit G4. The ratio over the upper limit of Condition (5) is undesirable because the variation in curvature of field with zooming becomes large. The upper limit of Condition (5) is preferably set to 0.42. On the other hand, the ratio below the lower limit of Condition (5) is undesirable because the spherical aberration becomes large. The lower limit of Condition (5) is preferably set to 0.20.

The zoom lens is preferably configured as follows: the object-side lens surface of the negative meniscus lens L21 in the second lens unit G2 consists of an aspherical surface; at least one of the lens surfaces of the positive lens L23 in the second lens unit G2 consists of an aspherical surface. This configuration allows the zoom lens to have the half angle of view at the wide-angle end larger than 35° and the zoom ratio of 5× or more.

This zoom lens ZL is preferably configured to perform vibration reduction (VR) in such a manner that at least a part of the third lens unit G3 moves so as to have a component in a substantially perpendicular direction to the optical axis. In this configuration, since the fourth lens unit G4 with the negative refractive power is arranged on the image side, a moving amount of the image plane relative to a moving distance of the third lens unit G3 can be controlled by properly defining a refractive power layout of the third lens unit G3 and the fourth lens unit G4, which is effective.

This zoom lens ZL is preferably configured to perform VR in such a manner that at least a part of the second lens unit G2 moves so as to have a component in a substantially perpendicular direction to the optical axis. This configuration allows a lens shift amount to be decreased in the telephoto end region where a blur compensation amount on the image plane tends to become larger than in the wide-angle end region.

In this zoom lens ZL, the fifth lens unit G5 is preferably configured as a positive lens having an object-side lens surface of a convex shape on the object side and having a smaller radius of curvature than an image-side lens surface. During focusing with a photographing object at a finite distance, it is preferable to move the fifth lens unit G5 along the optical axis toward the object, which decreases variation in aberration of curvature of field in close range focusing and which decreases variation in spherical aberration in close range focusing.

This zoom lens ZL is preferably configured as follows: with a photographing object at infinity and during change of a lens position state from the wide-angle end state to the telephoto end state, the first lens unit G1 and the third lens unit G3 move toward the object, and the second lens unit G2 moves along the optical axis toward the image from the wide-angle end state to a predetermined intermediate focal length state and moves along the optical axis toward the object from the predetermined intermediate focal length state to the telephoto end state. When the first lens G1 moves toward the object in this manner, the overall length in retraction of the lens barrel can be made small in spite of the zoom lens with a high zoom ratio and the overall length of the retracted barrel smaller than the overall length at the wide-angle end of the first lens unit G1 can be incorporated by a simple method. Furthermore, the second lens unit G2 moves in a concave locus on the object side and the third lens unit G3 moves toward the object, which achieves efficient magnification variation, which allows the second lens unit G2 to decrease a space necessary for magnification variation, and which ensures a space for movement of the third lens unit G3 toward the object for magnification variation.

When the third lens unit G3 has the positive refractive power and the fourth lens unit G4 has the negative refractive power so as to configure the zoom lens of a telephoto type, the back focus of the entire optical system becomes shorter. Furthermore, this configuration decreases the incident beam height to the first lens unit G1 at the maximum angle of coverage and therefore the effective diameter of the first lens unit G1 also becomes smaller. The third lens unit G3 is preferably configured so that an object-side lens surface and an image-side lens surface are aspherical surfaces. The object-side lens surface is one of lens surfaces from the lens surface nearest to the object to an object-side lens surface of a lens with the largest center thickness in the third lens unit G3. The image-side lens surface is one of lens surfaces from an image-side lens surface of the lens with the largest center thickness to the lens surface nearest to the image in the third lens unit G3.

This zoom lens ZL is preferably configured as follows: the third lens unit G3 is composed of, in order from the object side, a negative meniscus lens with an object-side lens surface of an aspherical surface of a convex shape on the object side (e.g., the lens of L31 in FIG. 1), and a biconvex lens with an image-side lens surface of an aspherical surface (e.g., the lens of L32 in FIG. 1); the fourth lens unit G4 is composed of a negative meniscus lens with a convex surface on the object side (e.g., the lens of L41 in FIG. 1); this configuration allows the zoom lens ZL to be downsized while maintaining various aberrations satisfactory.

This zoom lens ZL is preferably configured as follows: the third lens unit G3 is composed of, in order from the object side, a positive lens with an object-side lens surface of an aspherical surface of a convex shape on the object side (e.g., the lens of L31 in FIG. 4), a negative meniscus lens with a convex surface on the object side (e.g., the lens of L32 in FIG. 4), and a biconvex lens with an image-side lens surface of an aspherical surface (e.g., the lens of L33 in FIG. 4); the fourth lens unit G4 is composed of a negative meniscus lens with a convex surface on the object side (e.g., the lens of L41 in FIG. 4). This configuration permits the zoom lens to have better imaging performance.

Figure 13:
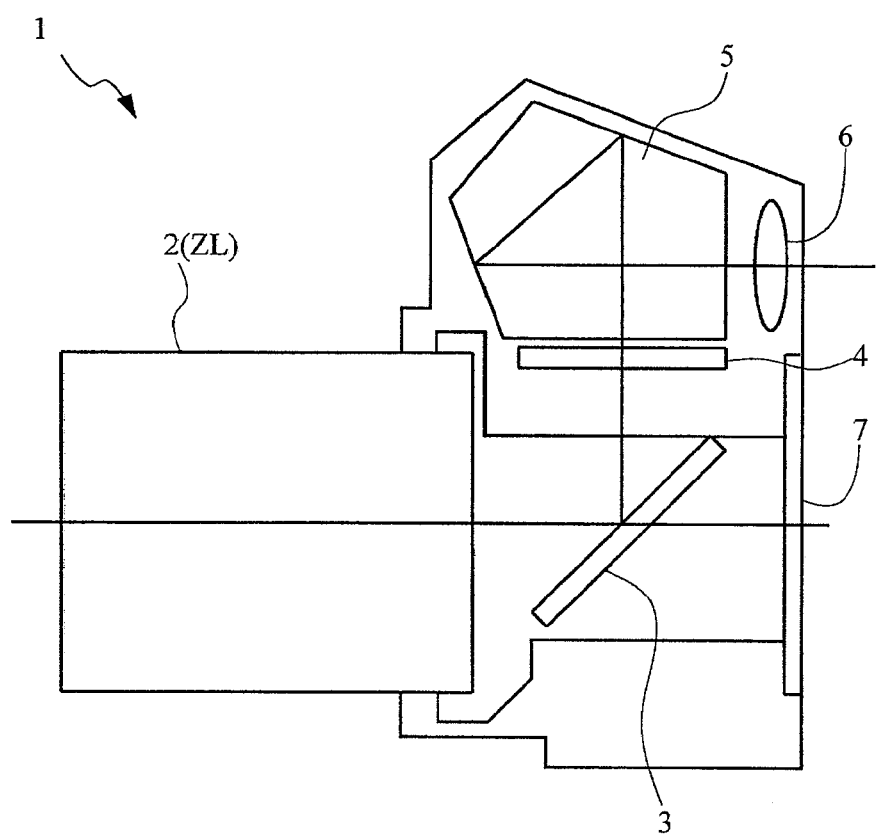
FIG. 13 is a cross-sectional view of a digital single-lens reflex camera equipped with a zoom lens according to the present invention.

FIG. 13 shows a schematic cross-sectional view of a digital single-lens reflex camera 1 (which will be referred to hereinafter simply as a camera), as an optical apparatus with the above-described zoom lens ZL. In this camera 1, light from an unillustrated object (subject) is condensed by a taking lens 2 (zoom lens ZL) and travels via a quick return mirror 3 to be focused on a focusing screen 4. Then the light focused on the focusing screen 4 is reflected multiple times in a pentagonal prism 5 to be guided to an eyepiece lens 6. This allows a photographer to observe an object (subject) image as an erect image through the eyepiece lens 6.

When the photographer pushes an unillustrated shutter release button, the quick return mirror 3 is retracted out of the optical path, and the light from the unillustrated object (subject) condensed by the taking lens 2 forms the subject image on an imaging device 7. This makes the light from the object (subject) picked up by the imaging device 7 and recorded as an object (subject) image in an unillustrated memory. In this manner, the photographer can take the object (subject) image with the camera 1. The camera 1 illustrated in FIG. 17 may be one detachably holding the zoom lens ZL, or one integrally molded with the zoom lens ZL. The camera 1 may be a so-called single-lens reflex camera or a compact camera without the quick return mirror and others.

The contents described below can be optionally adopted within a scope causing no deterioration of optical characteristics.

The embodiments in the description above and hereinafter showed the 5-unit configuration, and the present invention is also applicable to other unit configurations, e.g., 6-unit configuration. It is also possible to adopt a configuration wherein a lens or a lens unit is added nearest to the object, or a configuration wherein a lens or a lens unit is added nearest to the image. A lens unit refers to a portion having at least one lens, which is separated by an air space varying during magnification variation. Furthermore, it is also possible to change the moving modes of the respective lens units during magnification variation. For example, when the first lens unit G1 is fixed during magnification variation, there occurs no decentration aberration due to engagement difference of a moving mechanism for the first lens unit G1 with magnification variation. When a VR unit is fixed during magnification variation, it becomes feasible to separate the VR mechanism and the magnification varying mechanism.

A single lens unit or a plurality of lens units, or a partial lens unit may be arranged to move in the optical-axis direction, as a focusing lens unit for carrying out focusing from an infinity object to a close distance object. In this case, the focusing lens unit is also applicable to autofocus and is also suitable for motor driving (using an ultrasonic motor or the like) for autofocus. Particularly, the fifth lens unit G5 is preferably configured as a focusing lens unit. If the mechanism for magnification variation and the mechanism for focusing can coexist, at least a part of the first lens unit G1 and the second lens unit G2 may be configured as a focusing lens unit.

In the present embodiment, a lens unit or a partial lens unit may be configured as a VR lens unit that is moved so as to have a component in a direction perpendicular to the optical axis, thereby compensating for image blur caused by camera shake. The movement may be linear motion, or rotational movement (swing) with a rotation center at a point on the optical axis. Particularly, as described previously, at least a part of the second lens unit G2 and the third lens unit G3 may be configured as a VR lens unit to be functioned as a so-called VR zoom lens system. The third lens unit G3 and the fourth lens unit G4 may be configured together as a VR lens unit.

A lens surface may be formed as a spherical surface or a plane, or may be formed as an aspherical surface. When a lens surface is a spherical surface or a plane, it becomes easier to perform lens processing and assembly adjustment and it is feasible to prevent degradation of optical performance due to error of processing and assembly adjustment, which is favorable. It is also preferable because degradation of description performance is little even with deviation of the image plane. When a lens surface is an aspherical surface, the aspherical surface may be any one of an aspherical surface made by grinding, a glass mold aspherical surface molded of glass in aspherical shape, and a composite type aspherical surface in which resin is formed in aspherical shape on a surface of glass. A lens surface may be a diffractive surface and a lens may be a gradient index lens (GRIN lens) or a plastic lens.

The aperture stop S is preferably located near the third lens unit G3 or between the second lens unit G2 and the third lens unit G3, but a lens frame may function as a substitute for it, without provision of any member as the aperture stop S.

Furthermore, each lens surface may be provided with an antireflection coating having high transmittance over a wide wavelength range, so as to reduce flare and ghost and achieve optical performance with high contrast.

The zoom lens ZL of the present embodiment is preferably configured so that the first lens unit G1 has one positive lens component. The second lens unit G2 preferably has one positive lens component and two negative lens components. In this case, the lens components are preferably arranged in the order of negative, negative, and positive refractive powers in order from the object side and with an air space in between. The third lens unit G3 preferably has one or two positive lens components, and one negative lens component. In this case, the lens components are preferably arranged in the order of negative and positive refractive powers or in the order of positive, negative, and positive refractive powers in order from the object side. The fourth lens unit G4 preferably has one negative lens component. The fifth lens unit G5 preferably has one positive lens component.

The embodiment was described with the constitutive features thereof in order to comprehensively explain the present invention, but it is needless to mention that the present invention is not limited to this embodiment.

Figure 14:
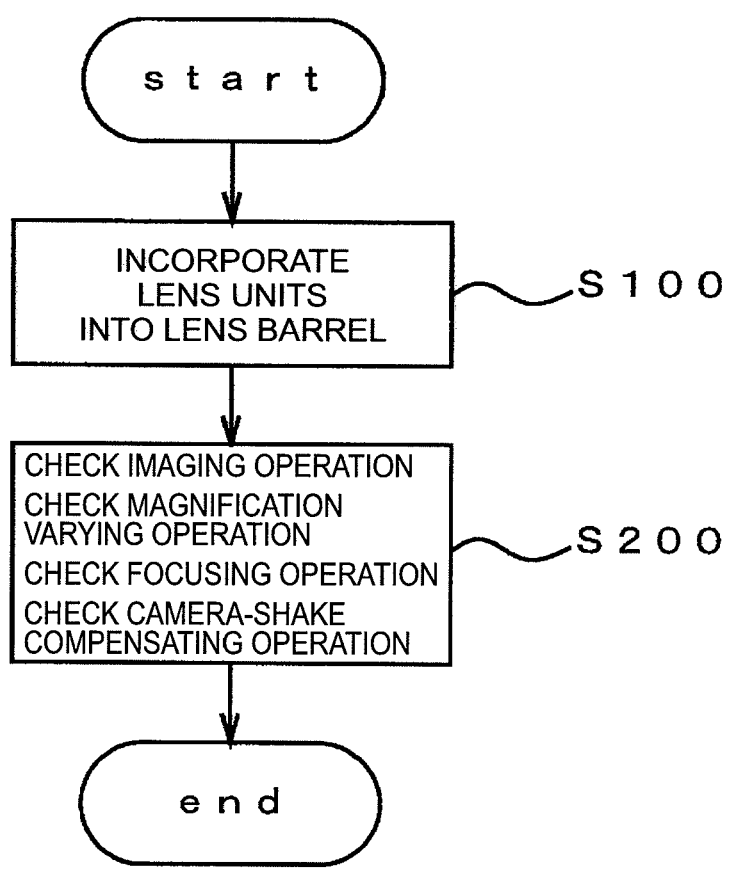
FIG. 14 is a flowchart for explaining a method of manufacturing a zoom lens according to the present invention.

The below will briefly describe a method of manufacturing the zoom lens ZL of the present embodiment, with reference to FIG. 14. First, the lenses are arranged to prepare each of the lens units. Specifically, in the present embodiment, the negative meniscus lens L11 with the convex surface on the object side and the positive lens L12 are arranged in order from the object side to form the first lens unit G1, and the negative meniscus lens L21 with the convex surface on the object side, the biconcave lens L22, and the positive lens L23 are arranged in order from the object side to form the second lens unit G2.

Next, each of the lens units is incorporated into a cylindrical lens barrel (step S100). When the lens units are incorporated into the lens barrel, the lens units may be incorporated one by one in order along the optical axis into the lens barrel, or some or all of the lens units may be integrally held by a holding member and then assembled with the lens barrel member. After the assembly of the zoom lens ZL as described above, various operations of the zoom lens ZL are checked (step S200). Examples of the various operations include an imaging operation to form an image of an object, a magnification varying operation to move at least a part of the lens units along the optical-axis direction during magnification variation, a focusing operation to move the focusing lens unit along the optical-axis direction from an infinity object to a close distance object, a camera shake compensation operation to move at least a lens so as to have a component in a substantially orthogonal direction to the optical axis, and so on. A checking order of the various operations is optional.

EXAMPLES

Each of examples of the present invention will be described below on the basis of the accompanying drawings. FIGS. 1, 4, 7, and 10 are cross-sectional views showing respective configurations of the zoom lens ZL according to the examples. The zoom lens ZL1 shown in FIG. 1 is configured to have, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, a fifth lens unit G5 having a positive refractive power, an optical low-pass filter OLPF, and a cover glass CG for a solid-state imaging device.

The first lens unit G1 is composed of a cemented lens in which a negative meniscus lens L11 with a convex surface on the object side and a positive lens L12 are cemented to each other in order from the object side. The second lens unit G2 is composed of a negative meniscus lens L21 with a convex surface on the object side, a biconcave lens L22, and a positive lens L23 in order from the object side.

The third lens unit G3 is configured to have a surface nearest to the object in a convex shape on the object side and a surface nearest to the image in a convex shape on the image side. A detailed lens configuration of this third lens unit G3 will be described in each example. The fourth lens unit G4 is composed of a negative meniscus lens L41 with a convex surface on the object side. The fifth lens unit G5 is composed of a positive meniscus lens L51 with a convex surface on the object side. A flare cut stop FS is located between the third lens unit G3 and the fourth lens unit G4.

In each example, during magnification variation from the wide-angle focal length to the telephoto focal length, the first lens unit G1 and the third lens unit G3 move toward the object and the second lens unit G2 moves along the optical axis in a concave locus on the object side. The fifth lens unit G5 moves along the optical axis toward the object during focusing with a photographing object at a finite distance. In each example a diagonal length from a center to an opposing corner of the solid-state imaging device is 4.05 mm.

In each example, an aspherical surface is represented by Eq (a) below, where y is a height in a direction normal to the optical axis, S(y) a distance (sag) along the optical axis from a tangent plane to a top of each aspherical surface at the height y to each aspherical surface, r a radius of curvature of a reference spherical surface (paraxial radius of curvature), κ the conic constant, and An the nth-order aspherical coefficient. In the examples hereinafter, "E-n" represents "×10$^{-n}$."

$$S(y)=(y^2/r)/\{1+(1-\kappa \times y^2/r^2)^{1/2}\}+A4\times y^4+A6\times y^6+A8\times y^8+A10\times y^{10} \quad (a)$$

In each example, the second-order aspherical coefficient A2 is 0. In the table of each example, an aspherical surface is accompanied by mark * to the left of a surface number.

First Example

FIG. 1 is a drawing showing a configuration of a high-zoom-ratio zoom lens ZL1 according to the first example, and showing positions of the respective lens units in the infinity in-focus state (a) at the wide-angle focal length, (b) at the intermediate focal length, and (c) at the telephoto focal length. The third lens unit G3 is composed of a cemented lens of a negative meniscus lens L31 with a convex surface on the object side and a biconvex lens L32 in order from the object side. The object-side lens surface of the negative meniscus lens L21 in the second lens unit G2, the object-side lens surface of the positive meniscus lens L23 in the second lens unit G2, the object-side lens surface of the negative meniscus lens L31 in the third lens unit G3, and the image-side lens surface of the biconvex lens L32 in the third lens unit G3 are formed in aspherical shape. The third lens unit G3 is moved in the normal direction to the optical axis to implement the blur compensation.

Table 1 below provides values of specifications of the first example. In this Table 1, f represents the focal length, FNO the F-number, ω the half angle of view, β a photographing magnification, Bf the back focus, and D0 a distance from the object to the object-side lens surface of the negative meniscus lens L11 in the first lens unit G1. Furthermore, the surface number represents an order of a lens surface from the object side along the traveling direction of rays, the surface separation an axial space from each optical surface to a next optical surface, and the refractive index and Abbe number values for the d-line (λ=587.6 nm). The unit of the focal length, the radius of curvature, the surface separation, and other lengths listed in all the specification values below is generally "mm," but it is not limited to this unit because equivalent optical performance is also achieved even with proportional enlargement or proportional reduction of the system. The radius of curvature of 0.0000 indicates a plane and the refractive index of air of 1.00000 is omitted. The notations of these signs and specification tables also apply to the examples hereinafter.

TABLE 1

| Surface Number | Radius of Curvature | Surface Separation | Abbe number | Refractive index |
|---|---|---|---|---|
| 1 | 27.5097 | 1.2000 | 25.46 | 2.000690 |
| 2 | 16.9301 | 4.9000 | 46.58 | 1.804000 |
| 3 | 176.2580 | (d3) | | |
| *4 | 24.4232 | 1.1000 | 49.23 | 1.768020 |
| 5 | 4.9392 | 2.9000 | | |
| 6 | −10.9213 | 1.0000 | 46.58 | 1.804000 |
| 7 | 7.3015 | 0.3000 | | |
| *8 | 6.3650 | 1.9000 | 25.10 | 1.902000 |
| 9 | 39.0608 | (d9) | | |
| 10 | 0.0000 | 0.3000 | aperture stop | |
| *11 | 3.7804 | 1.2000 | 25.10 | 1.902000 |
| 12 | 2.5897 | 3.7000 | 82.42 | 1.496970 |
| *13 | −13.9738 | 0.0000 | | |
| 14 | 0.0000 | (d14) | flare cut stop | |
| 15 | 24.9186 | 1.3000 | 40.77 | 1.883000 |
| 16 | 13.7154 | (d16) | | |
| 17 | 14.8202 | 1.8000 | 82.56 | 1.497820 |
| 18 | 169.4148 | (d18) | | |
| 19 | 0.0000 | 0.8000 | 64.12 | 1.516800 |
| 20 | 0.0000 | 0.5000 | | |
| 21 | 0.0000 | 0.5000 | 64.12 | 1.516800 |
| 22 | 0.0000 | Bf | | |

| | Wide-angle end | Intermediate focal length | Telephoto end |
|---|---|---|---|
| f = | 5.24 | ~15.00 | ~29.75 |
| FNO = | 3.4 | ~4.6 | ~5.7 |
| ω = | 39.4° | ~14.7° | ~7.6 |

In this first example, the lens surfaces of the fourth surface, the eighth surface, the eleventh surface, and the thirteenth surface are formed in aspherical shape. Table 2 below provides data of the aspherical surfaces, i.e., values of the conic constant κ and the respective aspherical constants A4-A10.

TABLE 2

| Surface | κ | A4 | A6 | A8 | A10 |
|---|---|---|---|---|---|
| 4 | −8.6644 | 2.72700E−04 | −1.57650E−06 | 0.00000E+00 | 0.00000E+00 |
| 8 | −1.223 | −3.27420E−05 | −1.95060E−05 | 3.03950E−06 | −1.47780E−07 |
| 11 | −0.4895 | 6.99170E−04 | 7.70230E−05 | −1.19480E−06 | 4.72130E−07 |
| 13 | −9.7561 | 1.32990E−03 | 1.14250E−04 | 0.00000E+00 | 0.00000E+00 |

In this first example, spaces varying during zooming are an axial air space d3 between the first lens unit G1 and the second lens unit G2, an axial space d9 between the second lens unit G2 and the third lens unit G3, an axial space d14 between the third lens unit G3 and the fourth lens unit G4, an axial space d16 between the fourth lens unit G4 and the fifth lens unit G5, and an axial air space d18 between the fifth lens unit G5 and the optical low-pass filter OLPF. Table 3 below provides the varying spaces at respective focal lengths in the wide-angle end state, the intermediate focal length state, and the telephoto end state with the object at infinity and at a close object distance. Table 3 also provides moving distances of the VR lens unit and moving distances of the image plane with VR.

TABLE 3

[Variable spaces in focusing]

| | Infinity | | |
|---|---|---|---|
| | Wide-angle end | Intermediate focal length | Telephoto end |
| F | 5.24000 | 15.00000 | 29.75200 |
| D0 | ∞ | ∞ | ∞ |

TABLE 3-continued

| d3 | 0.79193 | 12.34061 | 19.89818 |
| d9 | 8.77809 | 2.69704 | 0.99137 |
| d14 | 1.93710 | 6.24562 | 4.05028 |
| d16 | 4.48459 | 1.26959 | 4.63532 |
| d18 | 1.15960 | 5.53369 | 10.21522 |
| Bf | 0.40631 | 0.40631 | 0.40631 |
| Overall length | 41.01841 | 51.95365 | 63.65746 |

| | Close object distance | | |
|---|---|---|---|
| | Wide-angle end | Intermediate focal length | Telephoto end |
| β | −0.05000 | −0.05000 | −0.05000 |
| D0 | 91.82230 | 264.75800 | 536.61950 |
| d3 | 0.79193 | 12.34061 | 19.89818 |
| d9 | 8.77809 | 2.69704 | 0.99137 |
| d14 | 1.93710 | 6.24562 | 4.05028 |
| d16 | 3.52332 | −0.24109 | 2.48517 |
| d18 | 2.12087 | 7.04438 | 12.36537 |
| Bf | 0.40631 | 0.40631 | 0.40631 |
| Overall length | 41.01841 | 51.95365 | 63.65746 |

[Moving distances of VR lens unit and image plane with V]

| | Infinity | | |
|---|---|---|---|
| | Wide-angle end | Intermediate focal length | Telephoto end |
| f | 5.24000 | 15.00000 | 29.75200 |
| lens | ±0.061 | ±0.076 | ±0.086 |
| image plane | ±0.112 | ±0.190 | ±0.267 |

TABLE 3-continued

| | Close object distance | | |
|---|---|---|---|
| | Wide-angle end | Intermediate focal length | Telephoto end |
| β | −0.05000 | −0.05000 | −0.05000 |
| lens | ±0.061 | ±0.076 | ±0.085 |
| image plane | ±0.112 | ±0.190 | ±0.267 |

Table 4 below provides the focal lengths of the respective lens units and values corresponding to the respective conditions in this first example. In this Table 4, f1 represents the focal length of the first lens unit G1, f2 the focal length of the second lens unit G2, f3 the focal length of the third lens unit G3, f4 the focal length of the fourth lens unit G4, f5 the focal length of the fifth lens unit G5, and n11 the refractive index at the d-line of the medium of the negative meniscus lens L11 in the first lens unit G1. The notations of the signs also apply to the examples hereinafter.

TABLE 4 f1 = 47.940
f2 = −5.081
f3 = 7.895
f4 = −36.537
f5 = 32.498
(1) (−f2) × f3/(f1$^2$) = 0.017
(2) (−f2)/f1 = 0.106
(3) f5/f1 = 0.678
(4) n11 = 2.001
(5) f3/(−f4) = 0.216

Figure 2:
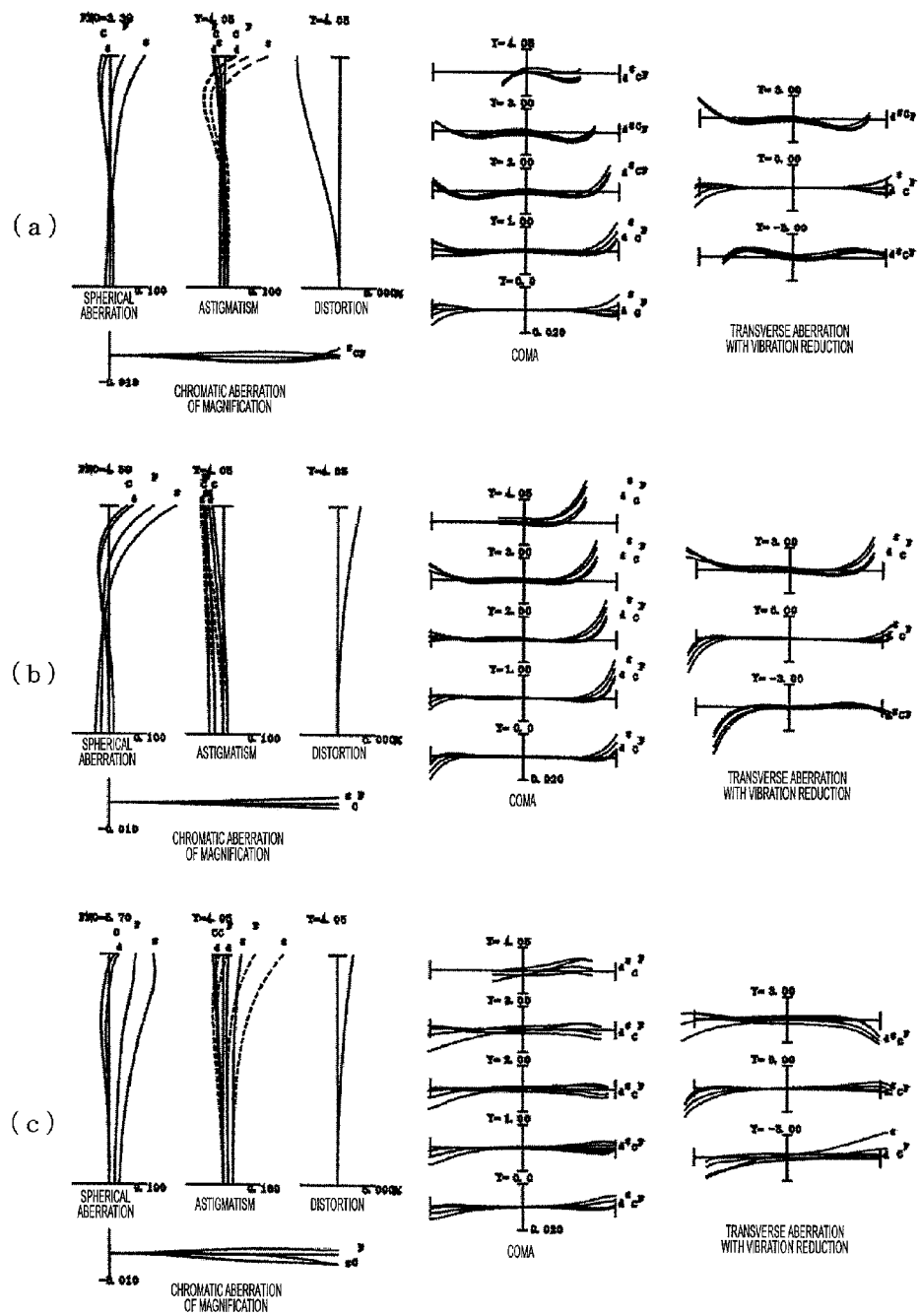
FIG. 2 is various aberration diagrams and transverse aberration diagrams with vibration reduction in the infinity in-focus state in the first example, wherein (a) is various aberration diagrams and transverse aberration diagram with vibration reduction in the wide-angle end state, (b) is various aberration diagrams and transverse aberration diagram with vibration reduction in the intermediate focal length state, and (c) is various aberration diagrams and transverse aberration diagram with vibration reduction in the telephoto end state.
Figure 3:
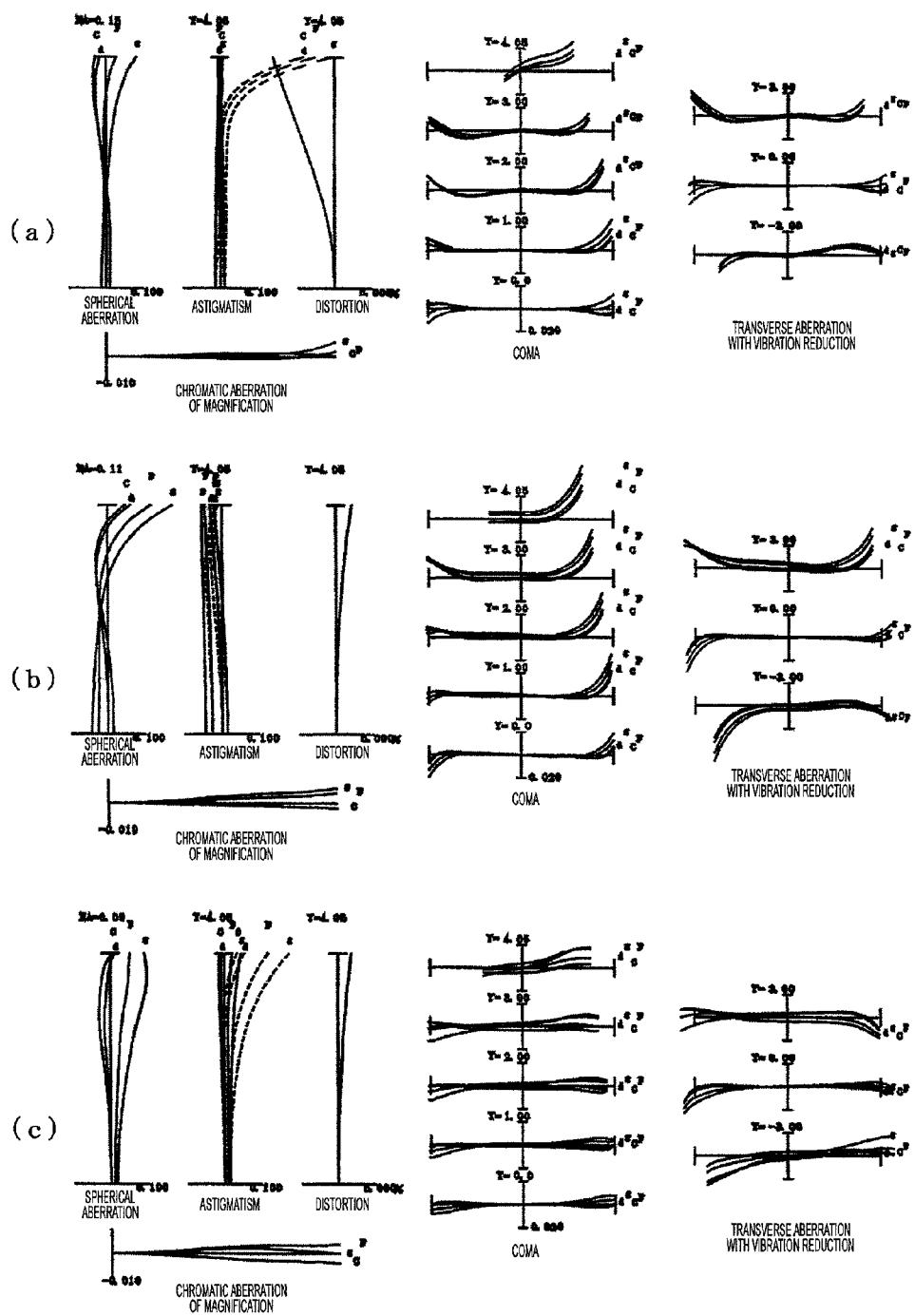
FIG. 3 is various aberration diagrams and transverse aberration diagrams with vibration reduction in a close object distance in-focus state in the first example, wherein (a) is various aberration diagrams and transverse aberration diagram with vibration reduction in the wide-angle end state, (b) is various aberration diagrams and transverse aberration diagram with vibration reduction in the intermediate focal length state, and (c) is various aberration diagrams and transverse aberration diagram with vibration reduction in the telephoto end state.

FIG. 2 (a) shows the aberration diagrams and transverse aberration diagram with VR in the infinity in-focus state in the wide-angle end state, FIG. 2 (b) the aberration diagrams and transverse aberration diagram with VR in the infinity in-focus state in the intermediate focal length state, and FIG. 2 (c) the aberration diagrams and transverse aberration diagram with VR in the infinity in-focus state in the telephoto end state in the first example. FIG. 3 (a) shows the aberration diagrams and transverse aberration diagram with VR in a close object distance (Rw=133 mm, Rm=317 mm, Rt=600 mm) in-focus state in the wide-angle end state, FIG. 3 (b) the aberration diagrams and transverse aberration diagram with VR in the close object distance in-focus state in the intermediate focal length state, and FIG. 3 (c) the aberration diagrams and transverse aberration diagram with VR in the close object distance in-focus state in the telephoto end state.

In each aberration diagram, FNO represents the F-number, Y the image height, NA the numerical aperture, d the d-line (λ=587.6 nm), C the C-line (λ=656.3 nm), F the F-line (λ=486.1 nm), and g the g-line (λ=435.6 nm). In the aberrations showing astigmatism, each solid line represents a sagittal image surface and each dashed line a meridional image surface. The aberration diagrams showing the chromatic aberration of magnification are shown on the basis of the d-line. This description of the aberration diagrams also applies to the examples hereinafter. As apparent from the aberration diagrams, the zoom lens of the first example is well corrected for the various aberrations in each of the focal length states from the wide-angle end state to the telephoto end state and has excellent imaging performance.

Second Example

Figure 4:
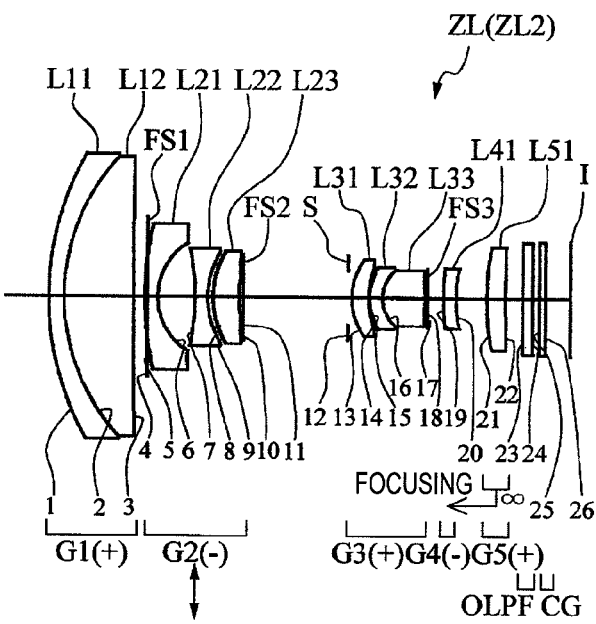
FIG. 4 is cross-sectional views showing a configuration of a zoom lens according to the second example and showing positions of respective lens units in an infinity in-focus state (a) at a wide-angle focal length, (b) at an intermediate focal length, and (c) at a telephoto focal length.
Figure 4:
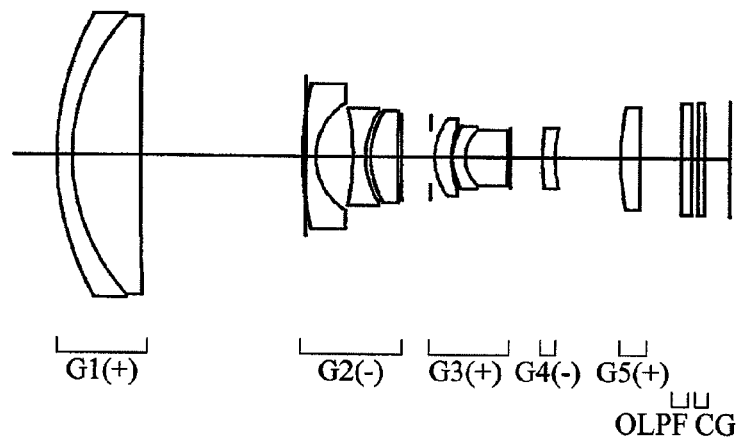
Figure 4:
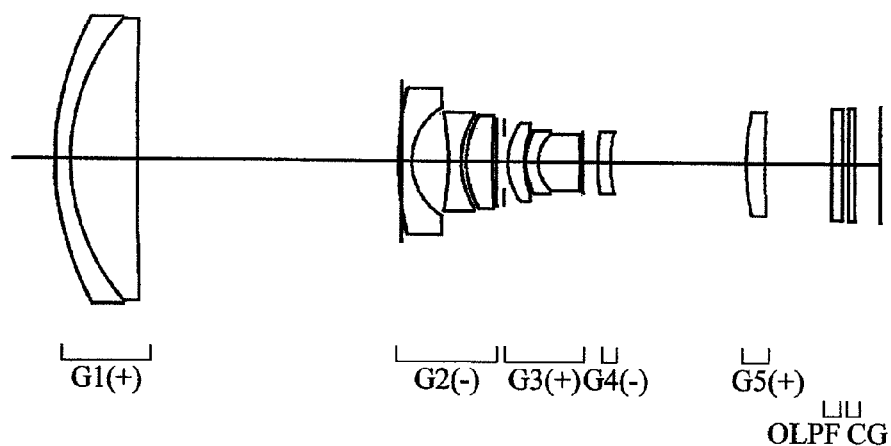

FIG. 4 is a drawing showing a configuration of a zoom lens ZL2 according to the second example, and showing positions of the respective lens units in the infinity in-focus state (a) at the wide-angle focal length, (b) at the intermediate focal length, and (c) at the telephoto focal length. The third lens unit G3 is composed of, in order from the object side, a positive meniscus lens L31 with an object-side lens surface of a convex shape on the object side, and a cemented lens of a negative meniscus lens L32 with a convex surface on the object side and a biconvex lens L33. The object-side lens surface of the negative meniscus lens L21 in the second lens unit G2, the object-side lens surface of the positive meniscus lens L23 in the second lens unit G2, the object-side lens surface of the negative meniscus lens L32 in the third lens unit G3, and the image-side lens surface of the biconvex lens L33 in the third lens unit G3 are formed in aspherical shape. In the second example, a flare cut stop FS3 is located between the third lens unit G3 and the fourth lens unit G4 and, furthermore, flare cut stops FS1, FS2 are also arranged in front of and behind the second lens unit G2. The second lens unit G2 is moved in the normal direction to the optical axis to implement the blur compensation.

Table 5 below provides values of specifications of the second example.

TABLE 5

| Surface Number | Radius of Curvature | Surface Separation | Abbe number | Refractive index |
|---|---|---|---|---|
| 1 | 23.1334 | 1.2000 | 31.31 | 1.903660 |
| 2 | 16.3749 | 5.4000 | 65.47 | 1.603000 |
| 3 | 391.4411 | (d3) | | |
| 4 | 0.0000 | −0.2000 | flare cut stop | |
| *5 | 29.5449 | 1.0000 | 40.10 | 1.851350 |
| 6 | 5.0566 | 2.9000 | | |
| 7 | −19.5260 | 1.0000 | 52.32 | 1.754999 |
| 8 | 7.0238 | 0.4000 | | |
| *9 | 6.9419 | 2.1000 | 24.06 | 1.821140 |
| 10 | 69.7314 | 0.3000 | | |
| 11 | 0.0000 | (d11) | flare cut stop | |
| 12 | 0.0000 | 0.3000 | aperture stop | |
| 13 | 5.1229 | 1.3000 | 49.61 | 1.772500 |
| 14 | 6.6417 | 0.1000 | | |
| *15 | 4.8572 | 1.0000 | 24.06 | 1.821140 |
| 16 | 3.0279 | 3.3000 | 82.42 | 1.496970 |
| *17 | −19.3974 | 0.2000 | | |
| 18 | 0.0000 | (d18) | flare cut stop | |
| 19 | 18.5170 | 1.0000 | 40.77 | 1.883000 |
| 20 | 11.0889 | (d20) | | |
| 21 | 20.2583 | 1.5000 | 64.12 | 1.516800 |
| 22 | 392.2561 | (d22) | | |
| 23 | 0.0000 | 0.8000 | 64.12 | 1.516800 |
| 24 | 0.0000 | 0.5000 | | |
| 25 | 0.0000 | 0.5000 | 64.12 | 1.516800 |
| 26 | 0.0000 | Bf | | |

| | Wide-angle end | Intermediate focal length | Telephoto end |
|---|---|---|---|
| f = | 5.24 | ~15.00 | ~29.75 |
| FNO = | 3.2 | ~4.6 | ~5.8 |
| ω = | 39.1° | ~14.6° | ~7.5° |

In this second example, the lens surfaces of the fifth surface, the ninth surface, the fifteenth surface, and the seventeenth surface are formed in aspherical shape. Table 6 below provides data of the aspherical surfaces, i.e., values of the conic constant κ and the respective aspherical constants A4-A10.

TABLE 6

| Surface | κ | A4 | A6 | A8 | A10 |
|---|---|---|---|---|---|
| 5 | 7.5508 | 9.86700E−05 | −2.42740E−06 | 0.00000E+00 | 0.00000E+00 |
| 9 | −0.7837 | 1.37510E−04 | −3.38370E−05 | 4.49530E−06 | −1.75740E−07 |
| 15 | 0.3967 | −8.50510E−04 | −3.84740E−05 | 1.83030E−06 | −3.76580E−07 |
| 17 | −100.0000 | 5.44360E−04 | 1.87640E−04 | 0.00000E+00 | 0.00000E+00 |

In this second example, spaces varying during zooming are an axial air space d3 between the first lens unit G1 and the flare cut stop FS1 in front of the second lens unit G2, an axial air space d11 between the flare cut stop FS2 behind the second lens unit and the aperture stop S, an axial air space d18 between the flare cut stop FS3 on the third lens unit G3 side and the fourth lens unit G4, an axial air space d20 between the fourth lens unit G4 and the fifth lens unit G5, and an axial air space d22 between the fifth lens unit G5 and the optical low-pass filter OLPF. Table 7 below provides the varying distances at the respective focal lengths in the wide-angle end state, the intermediate focal length state, and the telephoto end state with the object at infinity and at a close object distance.

TABLE 7

[Variable spaces in focusing]

Infinity

| | Wide-angle end | Intermediate focal length | Telephoto end |
|---|---|---|---|
| f | 5.24000 | 15.00000 | 29.75200 |
| D0 | ∞ | ∞ | ∞ |
| d3 | 1.13151 | 12.89901 | 20.81925 |
| d11 | 8.12364 | 2.31578 | 0.54187 |
| d18 | 1.23845 | 2.49865 | 1.17903 |
| d20 | 2.33991 | 5.13226 | 10.63139 |
| d22 | 1.32158 | 3.22867 | 5.19549 |
| Bf | 0.40633 | 0.40633 | 0.40633 |
| Overall length | 40.73233 | 52.65160 | 64.94425 |

Close object distance

| | Wide-angle end | Intermediate focal length | Telephoto end |
|---|---|---|---|
| β | −0.05000 | −0.05000 | −0.05000 |
| D0 | 92.02480 | 261.83760 | 521.01580 |
| d3 | 1.13151 | 12.89901 | 20.81925 |
| d11 | 8.12364 | 2.31578 | 0.54187 |
| d18 | 1.23845 | 2.49865 | 1.17903 |
| d20 | 1.39326 | 3.12761 | 7.45957 |
| d22 | 2.26824 | 5.23332 | 8.36731 |
| Bf | 0.40633 | 0.40633 | 0.40633 |
| Overall Length | 40.73233 | 52.65160 | 64.94425 |

[Moving distances of VR lens unit and image plane with V]

Infinity

| | Wide-angle end | Intermediate focal length | Telephoto end |
|---|---|---|---|
| f | 5.24000 | 15.00000 | 29.75200 |
| lens | ±0.138 | ±0.111 | ±0.105 |
| image plane | ±0.112 | ±0.190 | ±0.267 |

Close object distance

| | Wide-angle end | Intermediate focal length | Telephoto end |
|---|---|---|---|
| β | −0.05000 | −0.05000 | −0.05000 |
| lens | ±0.146 | ±0.115 | ±0.109 |
| image plane | ±0.112 | ±0.190 | ±0.267 |

Table 8 below provides the focal lengths of the respective lens units and the values corresponding to the respective conditions in this second example.

Figure 5:
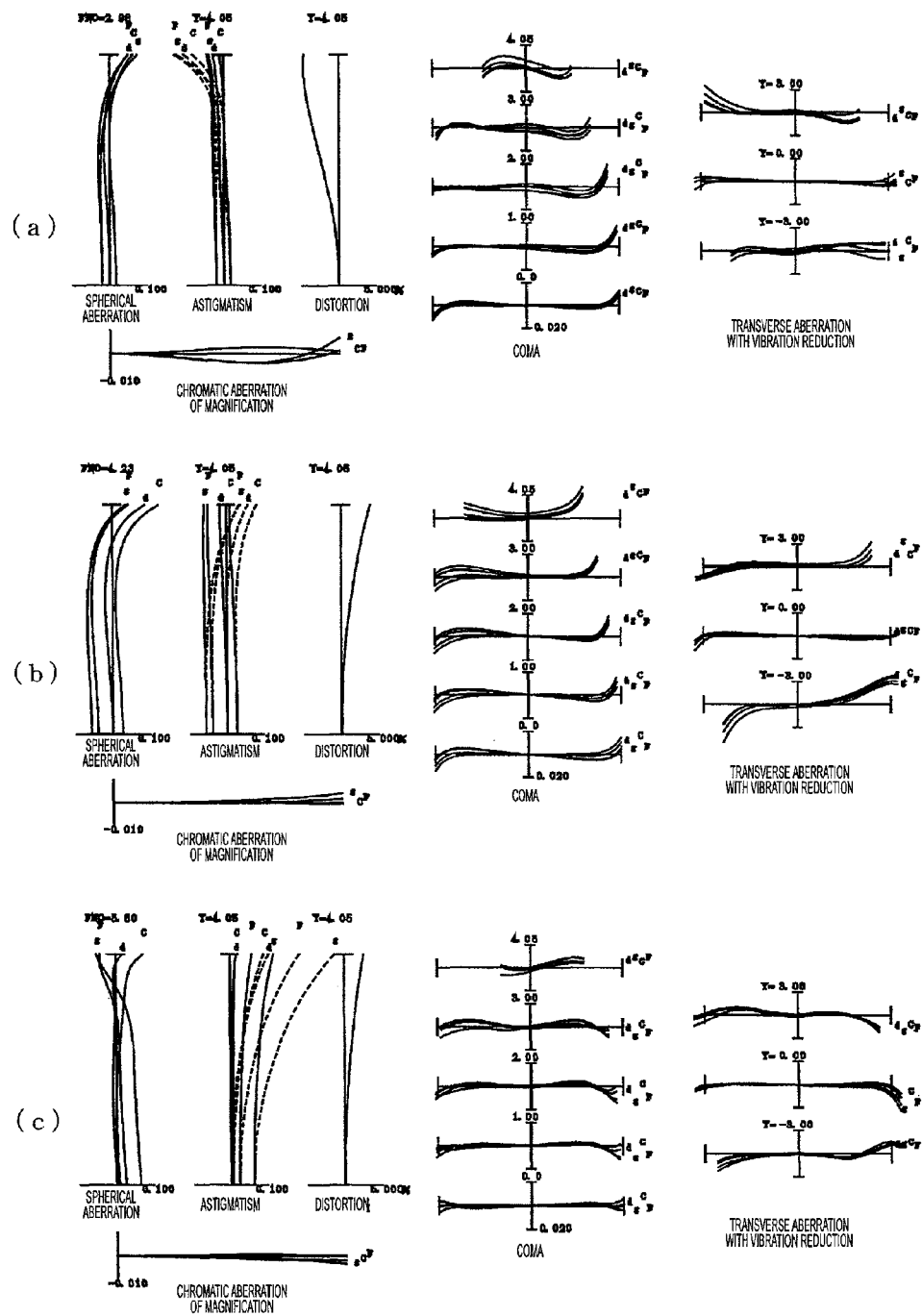
FIG. 5 is various aberration diagrams and transverse aberration diagrams with vibration reduction in the infinity in-focus state in the second example, wherein (a) is various aberration diagrams and transverse aberration diagram with vibration reduction in the wide-angle end state, (b) is various aberration diagrams and transverse aberration diagram with vibration reduction in the intermediate focal length state, and (c) is various aberration diagrams and transverse aberration diagram with vibration reduction in the telephoto end state.
Figure 6:
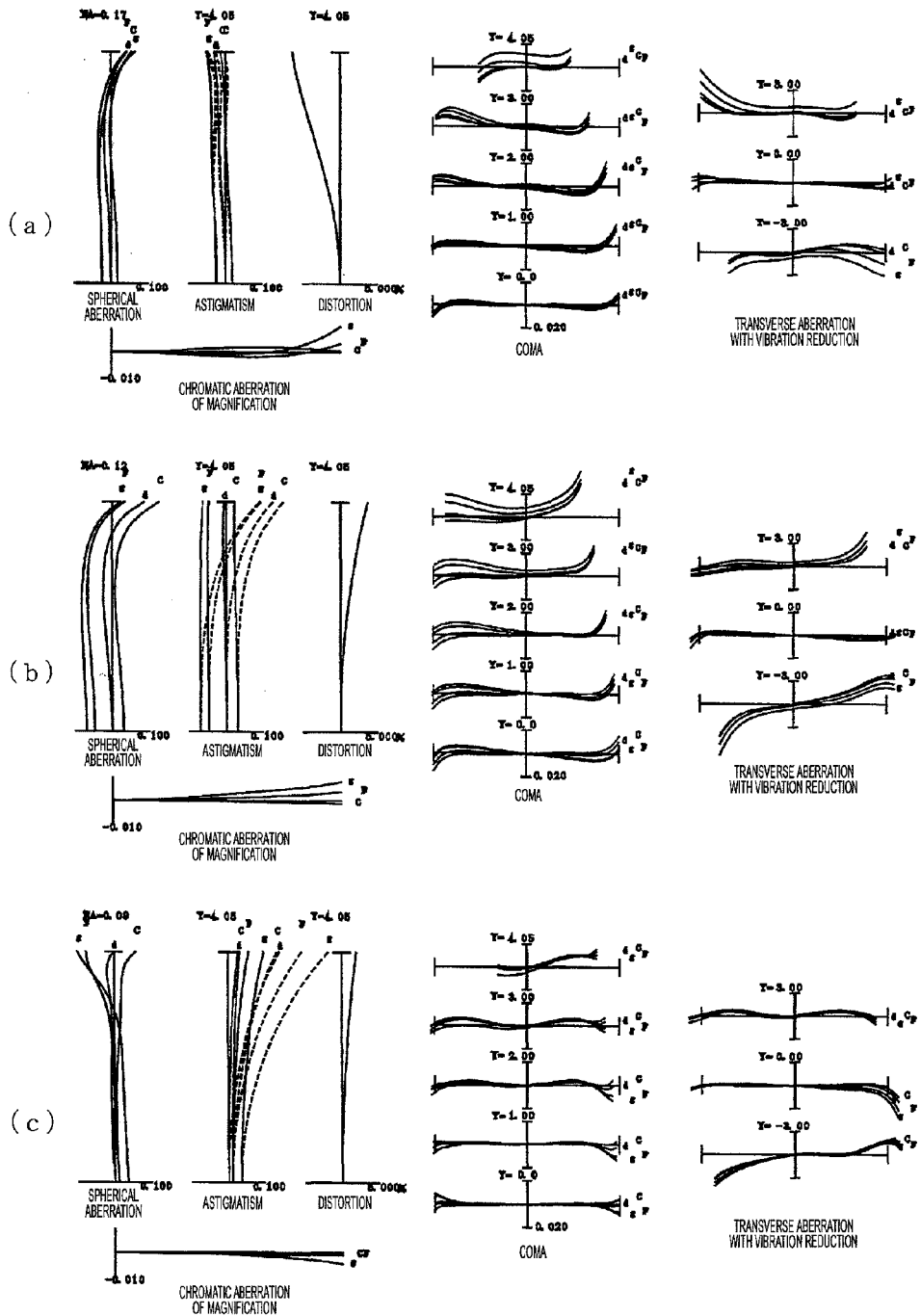
FIG. 6 is various aberration diagrams and transverse aberration diagrams with vibration reduction in a close object distance in-focus state in the second example, wherein (a) is various aberration diagrams and transverse aberration diagram with vibration reduction in the wide-angle end state, (b) is various aberration diagrams and transverse aberration diagram with vibration reduction in the intermediate focal length state, and (c) is various aberration diagrams and transverse aberration diagram with vibration reduction in the telephoto end state.

TABLE 8 f1 = 50.604
f2 = −5.586
f3 = 7.859
f4 = −33.415
f5 = 41.277
(1) $(-f2) \times f3/(f1^2) = 0.017$
(2) $(-f2)/f1 = 0.110$ TABLE 8-continued (3) $f5/f1 = 0.816$
(4) $n11 = 1.904$
(5) $f3/(-f4) = 0.235$ FIG. 5 (a) shows the aberration diagrams and transverse aberration diagram with VR in the infinity in-focus state in the wide-angle end state, FIG. 5 (b) the aberration diagrams and transverse aberration diagram with VR in the infinity in-focus state in the intermediate focal length state, and FIG. 5 (c) the aberration diagrams and transverse aberration diagram with VR in the infinity in-focus state in the telephoto end state in this second example. FIG. 6 (a) shows the aberration diagrams and transverse aberration diagram with VR in a close object distance (Rw=133 mm, Rm=317 mm, Rt=600 mm) in-focus state in the wide-angle end state, FIG. 6 (b) the aberration diagrams and transverse aberration diagram with VR in the close object distance in-focus state in the intermediate focal length state, and FIG. 6 (c) the aberration diagrams and transverse aberration diagram with VR in the close object distance in-focus state in the telephoto end state. As apparent from the aberration diagrams, the zoom lens of the second example is well corrected for the various aberrations in each of the focal length states from the wide-angle end state to the telephoto end state and has excellent imaging performance.

Third Example

Figure 7:
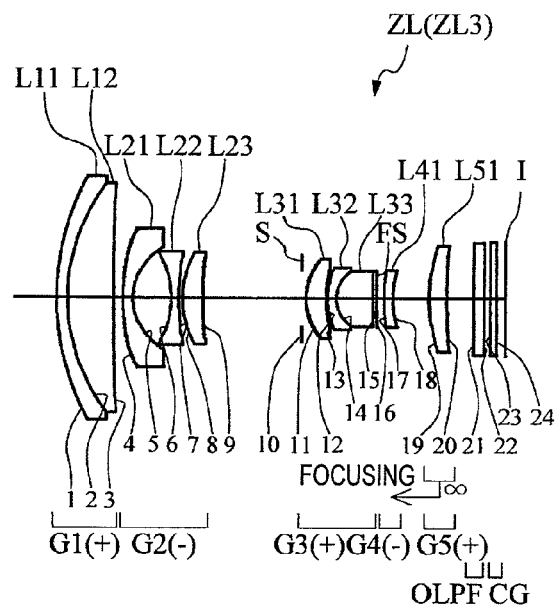
FIG. 7 is cross-sectional views showing a configuration of a zoom lens according to the third example and showing positions of respective lens units in an infinity in-focus state (a) at a wide-angle focal length, (b) at an intermediate focal length, and (c) at a telephoto focal length.
Figure 7:
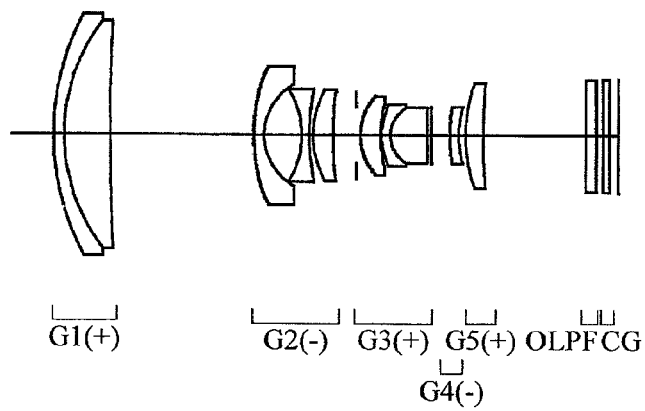
Figure 7:
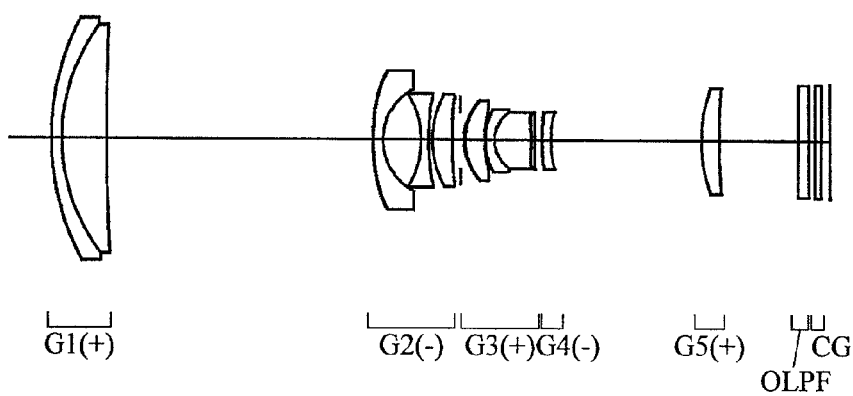

FIG. 7 is a drawing showing a configuration of a zoom lens ZL3 according to the third example, and showing positions of the respective lens units in the infinity in-focus state (a) at the wide-angle focal length, (b) at the intermediate focal length, and (c) at the telephoto focal length. The third lens unit G3 is composed of, in order from the object side, a positive meniscus lens L31 with an object-side lens surface of a convex shape on the object side, and a cemented lens of a negative meniscus lens L32 with a convex surface on the object side and a biconvex lens L33. The object-side lens surface of the negative meniscus lens L21 in the second lens unit G2, the image-side lens surface of the positive meniscus lens L23 in the second lens unit G2, the object-side lens surface of the positive meniscus lens L31 in the third lens unit G3, and the image-side lens surface of the biconvex lens L33 in the third lens unit G3 are formed in aspherical shape.

Table 9 below provides values of specifications of the third example.

TABLE 9

| Surface Number | Radius of Curvature | Surface Separation | Abbe number | Refractive index |
|---|---|---|---|---|
| 1 | 20.5705 | 0.8500 | 31.31 | 1.903660 |
| 2 | 15.0494 | 3.6000 | 65.47 | 1.603000 |
| 3 | 185.0508 | (d3) | | |
| *4 | 18.6406 | 0.8000 | 40.10 | 1.851350 |
| 5 | 4.6871 | 3.0000 | | |
| 6 | −7.0918 | 0.6000 | 52.29 | 1.755000 |
| 7 | 19.5697 | 0.3000 | | |
| 8 | 7.5636 | 1.6000 | 24.06 | 1.821140 |
| *9 | 81.0452 | (d9) | | |
| 10 | 0.0000 | 0.3000 | aperture stop | |
| *11 | 4.6293 | 1.6000 | 49.32 | 1.743300 |
| 12 | 9.9447 | 0.1000 | | |
| 13 | 5.7853 | 0.7000 | 31.31 | 1.903660 |
| 14 | 2.6492 | 2.9000 | 67.05 | 1.592010 |
| *15 | −40.1825 | 0.3000 | | |
| 16 | 0.0000 | (d16) | flare stop | |
| 17 | 17.3456 | 0.7000 | 40.77 | 1.883000 |

TABLE 9-continued

| 18 | 8.2391 | (d18) | | |
| 19 | 12.9378 | 1.4000 | 64.12 | 1.516800 |
| 20 | 52.5748 | (d20) | | |
| 21 | 0.0000 | 0.8000 | 64.12 | 1.516800 |
| 22 | 0.0000 | 0.5000 | | |
| 23 | 0.0000 | 0.5000 | 64.12 | 1.516800 |
| 24 | 0.0000 | Bf | | |

| | Wide-angle end | Intermediate focal length | Telephoto end |
|---|---|---|---|
| f = | 5.20 | ~15.00 | ~35.00 |
| FNO = | 3.0 | ~4.2 | ~5.8 |
| ω = | 39.3° | ~14.6° | ~6.4° |

In this third example, the lens surfaces of the fourth surface, the ninth surface, the eleventh surface, and the fifteenth surface are formed in aspherical shape. Table 10 below provides data of the aspherical surfaces, i.e., values of the conic constant κ and the respective aspherical constants A4-A10.

TABLE 10

| surface | κ | A4 | A6 | A8 | A10 |
|---|---|---|---|---|---|
| 4 | 8.3572 | 1.37270E−04 | −3.68070E−06 | 0.00000E+00 | 0.00000E+00 |
| 9 | −100.0000 | 8.53770E−04 | 2.45400E−05 | −2.74240E−06 | 1.53840E−07 |
| 11 | −0.2391 | −9.15390E−06 | 5.67610E−06 | 0.00000E+00 | 0.00000E+00 |
| 15 | −100.0000 | 2.21700E−03 | 4.10820E−05 | 0.00000E+00 | 0.00000E+00 |

In this third example, spaces varying during zooming are an axial air space d3 between the first lens unit G1 and the second lens unit G2, an axial air space d9 between the second lens unit G2 and the aperture stop S, an axial air space d16 between flare cut stop FS and the fourth lens unit G4, an axial air space d18 between the fourth lens unit G4 and the fifth lens unit G5, and an axial air space d20 between the fifth lens unit G5 and the optical low-pass filter OLPF. Table 11 below shows the varying distances at each of the focal lengths in the wide-angle end state, the intermediate focal length state, and the telephoto end state with the object at infinity and at a close object distance.

TABLE 11

[Variable spaces in focusing]

Infinity

| | Wide-angle end | Intermediate focal length | Telephoto end |
|---|---|---|---|
| f | 5.20000 | 15.00000 | 35.00000 |
| D0 | ∞ | ∞ | ∞ |
| d3 | 0.77360 | 11.37803 | 21.26380 |
| d9 | 7.83646 | 1.85004 | 0.62574 |
| d16 | 0.59325 | 1.48152 | 0.59325 |
| d18 | 2.82401 | 0.53452 | 11.96803 |
| d20 | 2.12038 | 8.13986 | 6.25583 |
| Bf | 0.71062 | 0.71063 | 0.71069 |
| Overall length | 35.40832 | 44.64460 | 61.96735 |

Close object distance

| | Wide-angle end | Intermediate focal length | Telephoto end |
|---|---|---|---|
| β | −0.05000 | −0.05000 | −0.05000 |
| D0 | 93.70690 | 276.37400 | 621.06040 |
| d3 | 0.77360 | 11.37803 | 21.26380 |
| d9 | 7.83646 | 1.85004 | 0.62574 |

TABLE 11-continued

[Variable spaces in focusing]

| d16 | 0.59325 | 1.48152 | 0.59325 |
|---|---|---|---|
| d18 | 2.01777 | −0.71609 | 8.86406 |
| d20 | 2.92662 | 9.39047 | 9.35980 |
| Bf | 0.71062 | 0.71063 | 0.71069 |
| Overall length | 35.40832 | 44.64460 | 61.96735 |

Table 12 below shows the focal lengths of the respective lens units and the values corresponding to the respective conditions in this third example.

TABLE 12 f1 = 46.889
f2 = −5.482
f3 = 6.818

TABLE 12-continued f4 = −18.437
f5 = 32.811
(1) (−f2) × f3/(f1$^2$) = 0.017
(2) (−f2)/f1 = 0.117
(3) f5/f1 = 0.700
(4) n11 = 1.904
(5) f3/(−f4) = 0.370

Figure 8:
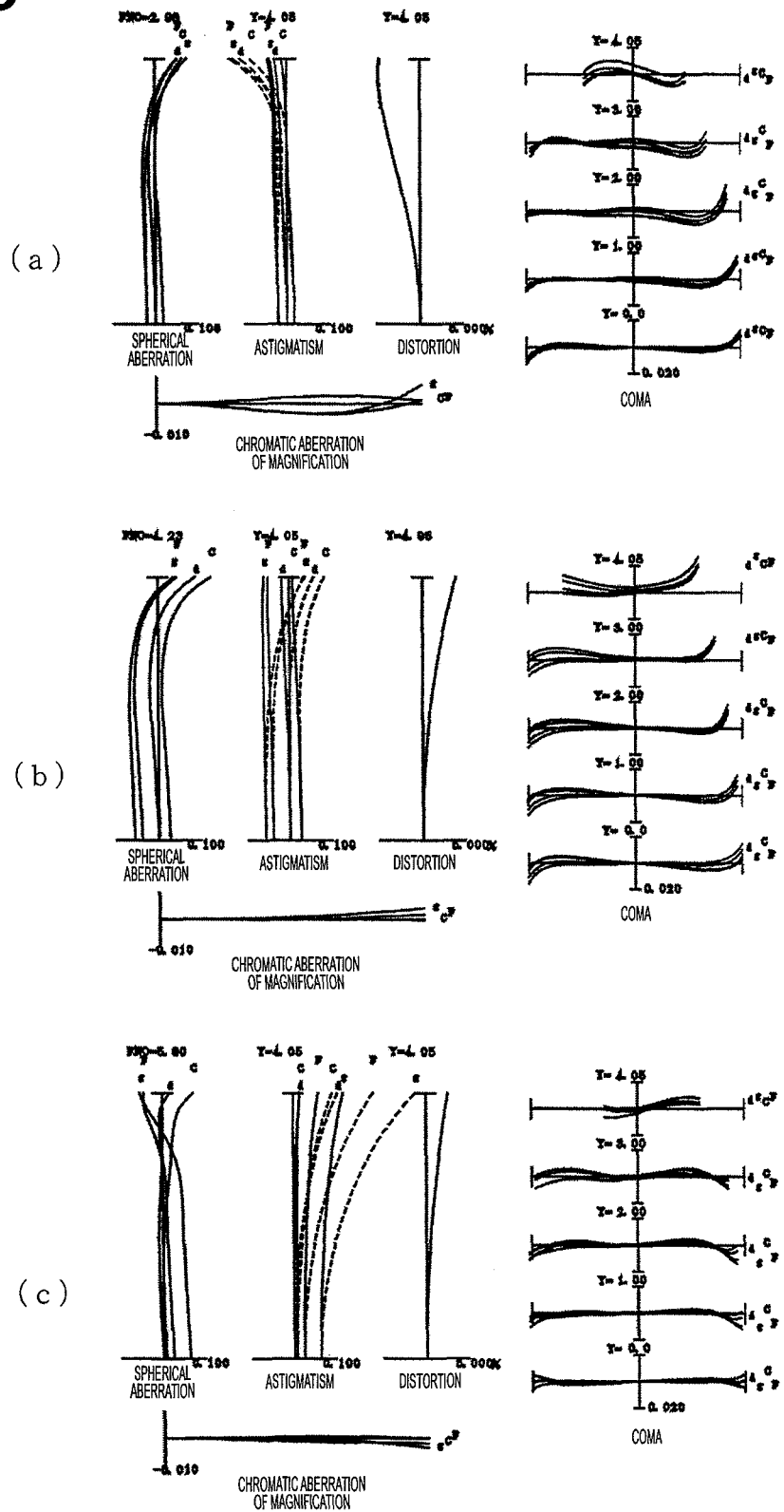
FIG. 8 is various aberration diagrams in the infinity in-focus state in the third example, wherein (a) is various aberration diagrams in the wide-angle end state, (b) is various aberration diagrams in the intermediate focal length state, and (c) is various aberration diagrams in the telephoto end state.
Figure 9:
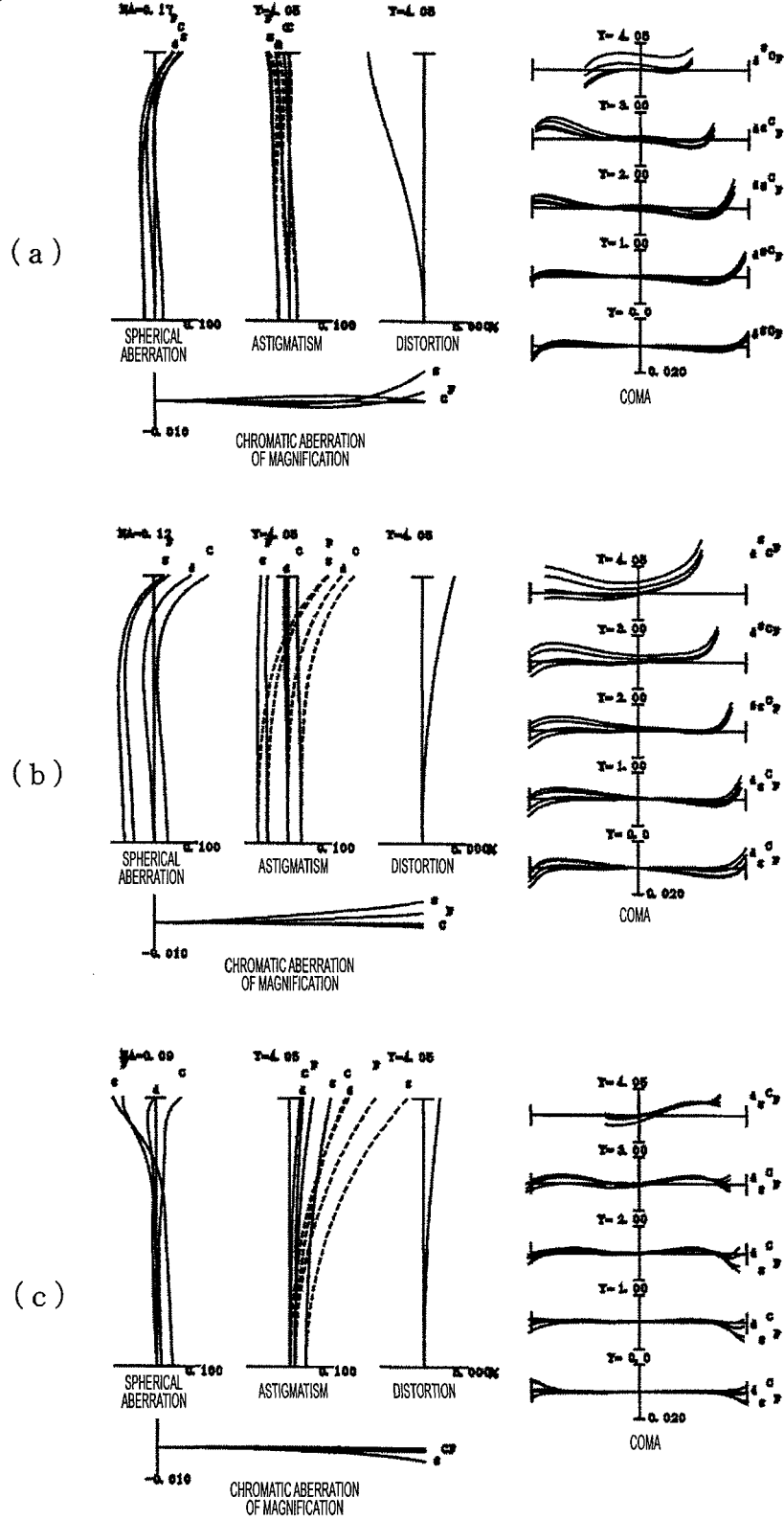
FIG. 9 is various aberration diagrams in a close object distance in-focus state in the third example, wherein (a) is various aberration diagrams in the wide-angle end state, (b) is various aberration diagrams in the intermediate focal length state, and (c) is various aberration diagrams in the telephoto end state.

FIG. 8 (a) shows the aberration diagrams in the infinity in-focus state in the wide-angle end state, FIG. 8 (b) the aberration diagrams in the infinity in-focus state in the intermediate focal length state, and FIG. 8 (c) the aberration diagrams in the infinity in-focus state in the telephoto end state in this third example. FIG. 9 (a) shows the aberration diagrams in a close object distance (Rw=133 mm, Rm=317 mm, Rt=600 mm) in-focus state in the wide-angle end state, FIG. 9 (b) the aberration diagrams in the close object distance in-focus state in the intermediate focal length state, and FIG. 9 (c) the aberration diagrams in the close object distance in-focus state in the telephoto end state. As apparent from the aberration diagrams, the zoom lens of the third example is well corrected for the various aberrations in each of the focal length states from the wide-angle end state to the telephoto end state and has excellent imaging performance.

Fourth Example

Figure 10:
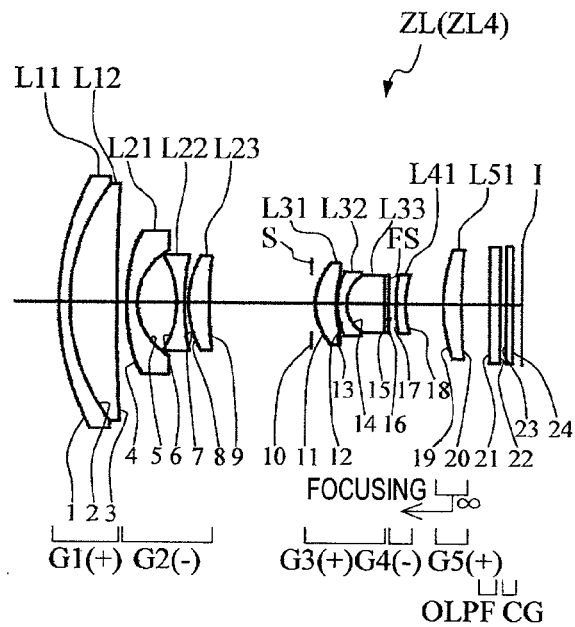
FIG. 10 is cross-sectional views showing a configuration of a zoom lens according to the fourth example and showing positions of respective lens units in an infinity in-focus state (a) at a wide-angle focal length, (b) at an intermediate focal length, and (c) at a telephoto focal length.
Figure 10:
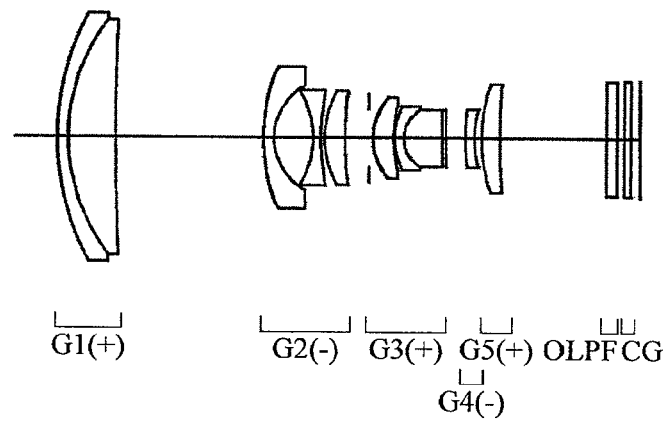
Figure 10:
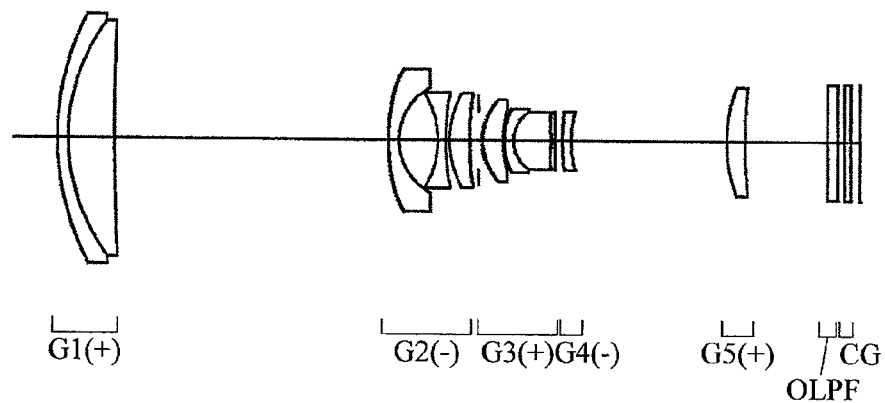

FIG. 10 is a drawing showing a configuration of a zoom lens ZL4 according to the fourth example, and showing positions of the respective lens units in the infinity in-focus state (a) at the wide-angle focal length, (b) at the intermediate focal length, and (c) at the telephoto focal length T. The third lens unit G3 is composed of, in order from the object side, a positive meniscus lens L31 with an object-side lens surface of a convex shape on the object side, and a cemented lens of a negative meniscus lens L32 with a convex surface on the object side and a biconvex lens L33. The object-side lens surface of the negative meniscus lens L21 in the second lens unit G2, the image-side lens surface of the positive meniscus lens L23 in the second lens unit G2, the object-side lens surface of the positive meniscus lens L31 in the third lens unit G3, and the image-side lens surface of the biconvex lens L33 in the third lens unit G3 are formed in aspherical shape.

Table 13 below provides values of specifications of the fourth example.

TABLE 13

| Surface Number | Radius of Curvature | Surface Separation | Abbe number | Refractive index |
|---|---|---|---|---|
| 1 | 40.6412 | 0.8000 | 25.46 | 2.000690 |
| 2 | 28.2157 | 3.0000 | 55.52 | 1.696800 |
| 3 | −248.3988 | (d3) | | |
| *4 | 20.3283 | 0.7000 | 40.10 | 1.851350 |
| 5 | 4.7773 | 3.0000 | | |
| 6 | −7.1182 | 0.6000 | 52.29 | 1.755000 |
| 7 | 15.3756 | 0.3000 | | |
| 8 | 8.7760 | 1.4000 | 24.06 | 1.821140 |
| *9 | −67.1622 | (d9) | | |
| 10 | 0.0000 | 0.3000 | aperture stop | |
| *11 | 4.3306 | 1.5000 | 49.23 | 1.768020 |
| 12 | 8.1228 | 0.1000 | | |
| 13 | 6.7870 | 0.8000 | 31.31 | 1.903660 |
| 14 | 2.6931 | 2.9000 | 67.05 | 1.592010 |
| *15 | −17.9541 | 0.3000 | | |
| 16 | 0.0000 | (d16) | flare stop | |
| 17 | 18.1191 | 0.6000 | 40.77 | 1.883000 |
| 18 | 10.8949 | (d18) | | |
| 19 | 15.5342 | 1.1000 | 64.12 | 1.516800 |
| 20 | 31.5412 | (d20) | | |
| 21 | 0.0000 | 0.8000 | 64.12 | 1.516800 |
| 22 | 0.0000 | 0.5000 | | |
| 23 | 0.0000 | 0.5000 | 64.12 | 1.516800 |
| 24 | 0.0000 | Bf | | |

| | Wide-angle end | Intermediate focal length | Telephoto end |
|---|---|---|---|
| f = | 5.20 | ~15.00 | ~29.75 |
| FNO= | 2.9 | ~4.4 | ~6.1 |
| ω = | 39.3° | ~14.5° | ~7.5° |

In this fourth example, the lens surfaces of the fourth surface, the ninth surface, the eleventh surface, and the fifteenth surface are formed in aspherical shape. Table 14 below shows data of the aspherical surfaces, i.e., values of the conic constant κ and the respective aspherical constants A4-A10.

TABLE 14

| surface | κ | A4 | A6 | A8 | A10 |
|---|---|---|---|---|---|
| 4 | 8.7918 | 8.15820E−05 | −2.43020E−06 | 0.00000E+00 | 0.00000E+00 |
| 9 | −100.0000 | 4.68610E−04 | 2.25190E−05 | −1.70990E−06 | 9.88520E−08 |
| 11 | −0.1603 | −2.51830E−04 | 4.91790E−06 | 0.00000E+00 | 0.00000E+00 |
| 15 | −49.4719 | 7.76570E−04 | 1.28900E−04 | 0.00000E+00 | 0.00000E+00 |

In this fourth example, spaces varying during zooming are an axial air space d3 between the first lens unit G1 and the second lens unit G2, an axial air space d9 between the second lens unit G2 and the aperture stop S, an axial air space d16 between the flare cut stop FS and the fourth lens unit G4, an axial air space d18 between the fourth lens unit G4 and the fifth lens unit G5, and an axial air space d20 between the fifth lens unit G5 and the optical low-pass filter OLPF. Table 15 below shows the varying distances at each of focal lengths in the wide-angle end state, the intermediate focal length state, and the telephoto end state with the object at infinity and at a close object distance.

TABLE 15

[Variable spaces in focusing]

| | Infinity | | |
|---|---|---|---|
| | Wide-angle end | Intermediate focal length | Telephoto end |
| f | 5.20000 | 15.00000 | 29.75200 |
| D0 | ∞ | ∞ | ∞ |
| d3 | 2.13790 | 14.10706 | 24.00163 |
| d9 | 7.18428 | 1.48172 | 0.43507 |
| d16 | 0.70000 | 1.92596 | 0.69998 |
| d18 | 3.36244 | 0.90830 | 13.14983 |
| d20 | 2.79157 | 10.28635 | 8.11872 |
| Bf | 0.40632 | 0.40630 | 0.40630 |
| Overall length | 35.78250 | 48.31569 | 66.01153 |

| | Close object distance | | |
|---|---|---|---|
| | Wide-angle end | Intermediate focal length | Telephoto end |
| β | −0.05000 | −0.05000 | −0.05000 |
| D0 | 93.74760 | 275.48500 | 534.77850 |
| d3 | 2.13790 | 14.10706 | 24.00163 |
| d9 | 7.18428 | 1.48172 | 0.43507 |
| d16 | 0.70000 | 1.92596 | 0.69998 |
| d18 | 2.14708 | −0.82129 | 9.45958 |
| d20 | 4.00693 | 12.01594 | 11.80897 |
| Bf | 0.40632 | 0.40630 | 0.40630 |
| Overall length | 35.78250 | 48.31569 | 66.01153 |

Table 16 below shows the focal lengths of the respective lens units and values corresponding to the respective conditions in this fourth example.

TABLE 16 f1 = 60.000
f2 = −5.455
f3 = 7.179
f4 = −32.200
f5 = 57.874
(1) (−f2) × f3/(f1$^2$) = 0.011
(2) (−f2)/f1 = 0.091
(3) f5/f1 = 0.965

TABLE 16-continued (4) n11 = 2.001
(5) f3/(−f4) = 0.223

Figure 11:
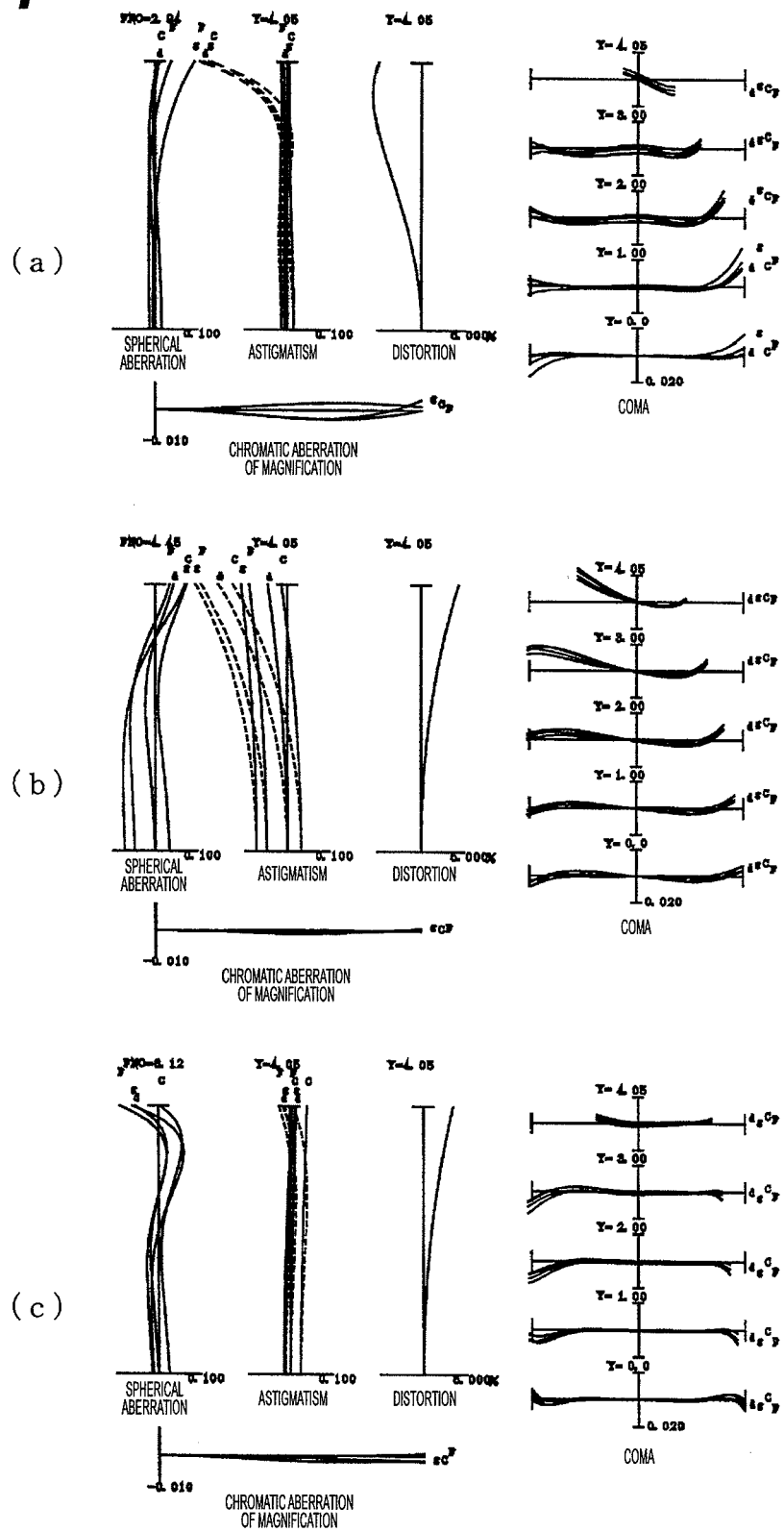
FIG. 11 is various aberration diagrams in the infinity in-focus state in the fourth example, wherein (a) is various aberration diagrams in the wide-angle end state, (b) is various aberration diagrams in the intermediate focal length state, and (c) is various aberration diagrams in the telephoto end state.
Figure 12:
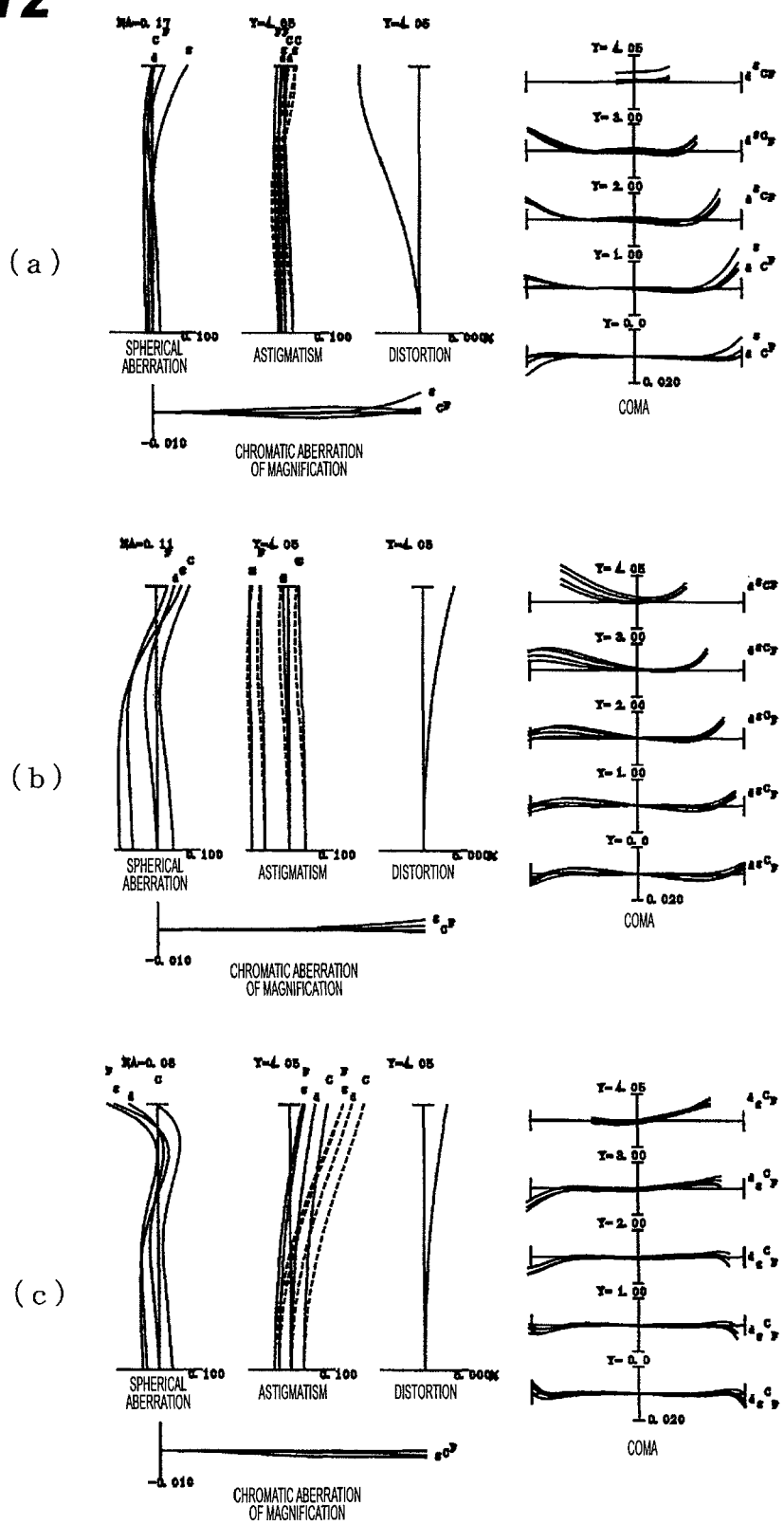
FIG. 12 is various aberration diagrams in a close object distance in-focus state in the fourth example, wherein (a) is various aberration diagrams in the wide-angle end state, (b) is various aberration diagrams in the intermediate focal length state, and (c) is various aberration diagrams in the telephoto end state.

FIG. 11 (a) shows the aberration diagrams in the infinity in-focus state in the wide-angle end state, FIG. 11 (b) the aberration diagrams in the infinity in-focus state in the intermediate focal length state, and FIG. 11 (c) the aberration diagrams in the infinity in-focus state in the telephoto end state in this fourth example. FIG. 12 (a) shows the aberration diagrams in a close object distance (Rw=133 mm, Rm=317 mm, Rt=600 mm) in-focus state in the wide-angle end state, FIG. 12 (b) the aberration diagrams in the close object distance in-focus state in the intermediate focal length state, and FIG. 12 (c) the aberration diagrams in the close object distance in-focus state in the telephoto end state. As apparent from the aberration diagrams, the zoom lens of the fourth example is well corrected for the various aberrations in each of the focal length states from the wide-angle end state to the telephoto end state and has excellent imaging performance.

REFERENCE SIGNS LIST

ZL (ZL1-ZL4) zoom lens
G1 first lens unit
G2 second lens unit
G3 third lens unit
G4 fourth lens unit
G5 fifth lens unit
S aperture stop
1 electronic still camera (optical apparatus)

The invention claimed is:

1. A zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
   wherein the first lens unit has a negative lens and a positive lens in order from the object side,
   wherein the second lens unit has an object-side negative lens, an image-side negative lens, and a positive lens in order from the object side,
   the zoom lens satisfying a condition of the following expression:

$0.005 < (-f2) \times f3/(f1^2) < 0.023$, where f1 is the focal length of the first lens unit, f2 the focal length of the second lens unit, and f3 the focal length of the third lens unit.

2. The zoom lens according to claim 1, wherein at least one of the negative lens and the object-side negative lens is a negative meniscus lens with a convex surface on the object side.

3. The zoom lens according to claim 1, wherein the image-side negative lens is of a biconcave shape.

4. The zoom lens according to claim 1, satisfying a condition of the following expression:

$0.050 < (-f2)/f1 < 0.140$.

5. The zoom lens according to claim 1, satisfying a condition of the following expression:

$0.57 < f5/f1 < 1.30$, where f5 is the focal length of the fifth lens unit.

6. The zoom lens according to claim 1, satisfying a condition of the following expression:

$1.85 < n11 < 2.30$, where n11 is a refractive index of a medium of the negative lens at the d-line.

7. The zoom lens according to claim 1, wherein the first lens unit is composed of a cemented lens of the negative lens and the positive lens, and wherein the second lens unit is configured so that all the lenses are arranged with an air space in between.

8. The zoom lens according to claim 1, satisfying a condition of the following expression:

$0.10 < f3/(-f4) < 0.45$, where f3 is the focal length of the third lens unit and f4 the focal length of the fourth lens unit.

9. The zoom lens according to claim 1, wherein an object-side lens surface of the object-side negative lens consists of an aspherical surface, and
   wherein at least one of lens surfaces of the positive lens in the second lens unit consists of an aspherical surface.

10. The zoom lens according to claim 1, wherein at least one of the second lens unit and the third lens unit is configured so that at least a part thereof moves so as to have a component in a substantially perpendicular direction to the optical axis.

11. The zoom lens according to claim 1, wherein the fifth lens unit is configured as a positive lens in which an object-side lens surface has a convex shape on the object side and has a smaller radius of curvature than an image-side lens surface, and
   wherein during focusing with a photographing object at a finite distance, the fifth lens unit moves along the optical axis toward the object.

12. The zoom lens according to claim 1, wherein with a photographing object at infinity and during change of a lens position state from a wide-angle end state to a telephoto end state,
   the first lens unit and the third lens unit move toward the object, and
   the second lens unit moves along the optical axis toward an image from the wide-angle end state to a predetermined intermediate focal length state and moves along the optical axis toward the object from the predetermined intermediate focal length state to the telephoto end state.

13. The zoom lens according to claim 1, wherein the third lens unit has, in order from the object side,
   a negative meniscus lens with a convex surface on the object side, and
   a biconvex lens with an image-side lens surface of an aspherical surface, and
   wherein the fourth lens unit has a negative meniscus lens with a convex surface on the object side.

14. The zoom lens according to claim 1, wherein the third lens unit has, in order from the object side,
   a positive lens with an object-side lens surface of an aspherical surface of a convex shape on the object side,
   a negative meniscus lens with a convex surface on the object side, and
   a biconvex lens with an image-side lens surface of an aspherical surface, and
   wherein the fourth lens unit has a negative meniscus lens with a convex surface on the object side.

15. An optical apparatus comprising the zoom lens as set forth in claim 1.

16. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
   the method comprising:
   arranging a negative lens and a positive lens in order from the object side, in the first lens unit;
   arranging an object-side negative lens with an object-side lens surface of an aspherical surface, an image-side negative lens, and a positive lens with at least one aspherical surface, in order from the object side, in the second lens unit; and
   satisfying a condition of the following expression:

$0.005 < (-f2) \times f3/(f1^2) < 0.023$, where f1 is the focal length of the first lens unit, f2 the focal length of the second lens unit, and f3 the focal length of the third lens unit.

17. The method of manufacturing the zoom lens according to claim 16, wherein at least one of the negative lens and the object-side negative lens is a negative meniscus lens with a convex surface on the object side.

18. The method of manufacturing the zoom lens according to claim 16, wherein the image-side negative lens is of a biconcave shape.

19. The method of manufacturing the zoom lens according to claim 16, wherein the first lens unit is composed of a cemented lens of the negative lens and the positive lens, and wherein the second lens unit is configured so that all the lenses are arranged with an air space in between.

20. The method of manufacturing the zoom lens according to claim 16, wherein at least one of the second lens unit and the third lens unit is configured so that at least a part thereof moves so as to have a component in a substantially perpendicular direction to the optical axis.

21. The method of manufacturing the zoom lens according to claim 16, wherein with a photographing object at infinity and during magnification variation from a wide-angle end state to a telephoto end state,
the first lens unit and the third lens unit move toward the object, and
the second lens unit moves along the optical axis toward an image from the wide-angle end state to a predetermined intermediate focal length state and moves along the optical axis toward the object from the predetermined intermediate focal length state to the telephoto end state.

22. The method of manufacturing the zoom lens according to claim 16, wherein the third lens unit has, in order from the object side, a negative meniscus lens with a convex surface on the object side, and a biconvex lens with an image-side lens surface of an aspherical surface, and
wherein the fourth lens unit has a negative meniscus lens with a convex surface on the object side.

23. The method of manufacturing the zoom lens according to claim 16, wherein the third lens unit has, in order from the object side, a positive lens with an object-side lens surface of an aspherical surface of a convex shape on the object side, a negative meniscus lens with a convex surface on the object side, and a biconvex lens with an image-side lens surface of an aspherical surface, and
wherein the fourth lens unit has a negative meniscus lens with a convex surface on the object side.

24. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
the method comprising:
arranging a negative lens and a positive lens in order from the object side, in the first lens unit;
arranging an object-side negative lens with an object-side lens surface of an aspherical surface, an image-side negative lens, and a positive lens with at least one aspherical surface, in the order from the object side, in the second lens unit; and
satisfying a condition of the following expression:

$$0.050 < (f2)/f1 < 0.140,$$

where f1 is the focal length of the first lens unit and f2 the focal length of the second lens unit.

25. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
the method comprising:
arranging a negative lens and a positive lens in order from the object side, in the first lens unity;
arranging an object-side negative lens with an object-side lens surface of an aspherical surface, and image-side negative lens, and a positive lens with at least one aspherical surface, in order from the object side, in the second lens unit; and
satisfying a condition of the following expression:

$$0.57 < f5/f1 < 1.30,$$

where f1 is the focal length of the first lens unit and f5 the focal length of the fifth lens unit.

26. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
the method comprising:
arranging a negative lens and a positive lens in order from the object side, in the first lens unit;
arranging an object-side negative lens with an object-side lens surface of an aspherical surface, an image-side negative lens, and a positive lens with at least one aspherical surface, in order from the object side, in the second lens unit; and
satisfying a condition of the following expression:

$$1.85 < n11 < 2.30,$$

where n11 is a refractive index of a medium of the negative lens at the d-line.

27. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
the method comprising:
arranging a negative lens and a positive lens in order from the object side, in the first lens unit;
arranging an object-side negative lens with an object-side lens surface of an aspherical surface, an image-side negative lens, and a positive lens with at least one aspherical surface, in order from the object side, in the second lens unit; and
satisfying a condition of the following expression:

$$0.10 < f3/(-f4) < 0.45,$$

where f3 is the focal length of the third lens unit and f4 the focal length of the fourth lens unit.

28. A method of manufacturing a zoom lens comprising, in order from the object side, a first lens unit having a positive refractive power, a second lens unit having a negative refractive power, a third lens unit having a positive refractive power, a fourth lens unit having a negative refractive power, and a fifth lens unit having a positive refractive power,
the method comprising:
arranging a negative lens and a positive lens in order from the object side, in the first lens unit;

arranging an object-side negative lens with an object-side lens surface of an aspherical surface, an image-side negative lens, and a positive lens with at least one aspherical surface, in order from the object side, in the second lens unit; and satisfying a condition of the following expression:

$$0.005<(-f2)=f3/(f1^2)<0.023,$$

where f1 is the focal length of the first lens unit, f2 the focal length of the second lens unit, and f3 the focal length of the third lens unit, wherein the fifth lens unit is configured as a positive lens in which an object-side lens surface has a convex shape on the object side and has a smaller radius of curvature than an image-side lens surface, and wherein during focusing with a photographing object at a finite distance, the fifth lens unit moves along the optical axis toward the object.

* * * * *